United States Patent
Bauer et al.

(10) Patent No.: US 8,182,154 B2
(45) Date of Patent: May 22, 2012

(54) FLUID DYNAMIC BEARING SYSTEM

(75) Inventors: Martin Bauer, Villingen-Schwenningen (DE); Jurgen Fleig, St. Georgen (DE); Stefan Schwamberger, Lohsa Ot. Hermsdorf (DE); Martin Engesser, Donaueschingen (DE); Igor Ross, Freiburg (DE); Thilo Rehm, Villingen-Schwenningen (DE)

(73) Assignee: Minebea Co., Ltd., Nagano-ken (JP)

( * ) Notice: Subject to any disclaimer, the term of this patent is extended or adjusted under 35 U.S.C. 154(b) by 1084 days.

(21) Appl. No.: 12/080,454

(22) Filed: Apr. 3, 2008

(65) Prior Publication Data

US 2008/0260310 A1 Oct. 23, 2008

(30) Foreign Application Priority Data

Apr. 17, 2007 (DE) .......................... 10 2007 017 952
Aug. 24, 2007 (DE) .......................... 10 2007 040 266
Dec. 21, 2007 (DE) .......................... 10 2007 062 921

(51) Int. Cl.
*F16C 32/06* (2006.01)
*F16C 17/10* (2006.01)

(52) U.S. Cl. ......... 384/107; 384/100; 384/113; 384/120

(58) Field of Classification Search .................. 384/100, 384/107, 112–113, 119, 123–124, 132; 310/90, 310/90.5

See application file for complete search history.

(56) References Cited

U.S. PATENT DOCUMENTS

| | | | |
|---|---|---|---|
| 4,254,961 A * | 3/1981 | Fersht et al. .................. 384/100 |
| 5,112,142 A | 5/1992 | Titcomb et al. | |
| 5,558,445 A * | 9/1996 | Chen et al. .................... 384/132 |
| 5,634,724 A * | 6/1997 | Zang et al. ..................... 384/124 |
| 5,839,833 A | 11/1998 | Zang | |
| 5,876,124 A * | 3/1999 | Zang et al. ..................... 384/107 |
| 5,941,644 A * | 8/1999 | Takahashi ...................... 384/112 |
| 6,296,391 B1 | 10/2001 | Hayakawa et al. | |

(Continued)

FOREIGN PATENT DOCUMENTS

DE 19840433 3/1999

(Continued)

*Primary Examiner* — Marcus Charles
(74) *Attorney, Agent, or Firm* — Cooper & Dunham LLP

(57) ABSTRACT

The invention relates to a fluid dynamic bearing system that comprises at least one stationary part that has a shaft and two bearing plates disposed on the shaft at a mutual spacing, and at least one rotating part that is supported so as to rotate about a rotational axis with respect to the stationary part, and comprises a bearing bush and a sleeve enclosing the bearing bush. A bearing gap filled with bearing fluid is provided between the parts and at least one sealing gap for sealing the bearing gap that extends concentric to the rotational axis. The bearing comprises at least one fluid dynamic radial bearing and two fluid dynamic axial bearings and at least one recirculation channel that connects the two axial bearing regions to each other. According to the invention, the largest radial diameter of the recirculation channel is greater than or equal to the largest diameter of the sealing gap, and the smallest radial diameter of the recirculation channel is greater than or equal to the largest diameter of an adjacent bearing plate. Moreover, additional and effective deairing of the recirculation channel is effected by a venting device. To realize improved equilibrium of pressure in the bearing gap and improved retention of the bearing fluid, the sealing gaps can be inclined, at least in sections, at an angle α, β with respect to the rotational axis, wherein the angles may have different sizes.

19 Claims, 13 Drawing Sheets

U.S. PATENT DOCUMENTS

| | | | |
|---|---|---|---|
| 6,404,087 B1 * | 6/2002 | Ichiyama | 310/90 |
| 6,854,889 B2 * | 2/2005 | Nishimura et al. | 384/119 |
| 7,281,852 B2 * | 10/2007 | Woldemar et al. | 384/130 |
| 7,345,392 B2 * | 3/2008 | Hafen et al. | 310/90 |
| 7,547,143 B2 * | 6/2009 | Addy | 384/107 |
| 2004/0056547 A1 | 3/2004 | Kull et al. | |
| 2006/0039635 A1 * | 2/2006 | Schmid | 384/100 |
| 2006/0291757 A1 | 12/2006 | LeBlanc | |
| 2007/0133911 A1 * | 6/2007 | Nishimoto et al. | 384/100 |

FOREIGN PATENT DOCUMENTS

| | | |
|---|---|---|
| DE | 10239650 | 3/2004 |
| EP | 0791761 | 8/1997 |
| GB | 2328987 | 3/1999 |
| GB | 270005 A | 5/2007 |

\* cited by examiner

FLUID DYNAMIC BEARING SYSTEM

BACKGROUND OF THE INVENTION

The invention relates to a fluid dynamic bearing system, particularly a bearing system to rotatably support spindle motors as are used, for example, for driving disk drives.

PRIOR ART

Nowadays, it is fluid dynamic bearings that are mostly used for the rotatable support of spindle motors for hard disk drives. A fluid dynamic bearing comprises at least one stationary part and at least one rotating part that is supported so as to rotate about a common rotational axis with respect to the stationary part. At least one gap is formed between the opposing bearing surfaces of the stationary and of the rotating part, the gap having a region filled with bearing fluid that is sealed against the environment using sealing means. The sealing means are meant to prevent bearing fluid from escaping from the bearing. One widespread method of sealing the bearing gap is the use of gap seals, particularly capillary seals, which exploit the material-specific properties of the bearing fluid, i.e. the active principles behind capillary, adhesive and cohesive forces.

Fluid dynamic bearing systems open at either one end or at both ends are known. A spindle motor having a bearing system of a well-known design and open at one end is revealed, for example, in DE 102 39 650 A1.

U.S. Pat. No. 6,404,087 B1 reveals a spindle motor having a bearing system open at two ends. In the case of this bearing system open at two ends, a hub connected to a bearing bush is rotatably supported about a stationary shaft, the bearing gap being open at both ends and sealed using capillary seals. These capillary seals take the form of taper seals (tapered capillary seals), in which the bearing gap tapers, widening towards the open ends. This tapered expansion of the bearing gap goes to produce concentric spaces that widen towards the outside between the surfaces of two bearing plates or thrust plates connected to the shaft and the surface of the hub, the spaces being proportionately filled with bearing fluid. The bearing fluid covers the surfaces of the thrust plates and the hub thereby forming a meniscus having a concave surface at the contact surface to the air. This goes to increase the retaining power of the bearing fluid, particularly when subject to shock, and to improve the sealing effect of the capillary seal. The bearing fluid found in the spaces also acts as a reservoir from which evaporating bearing fluid is replaced. In addition, the regions of the spaces not filled with bearing fluid act as equalizing volumes in which the bearing fluid can rise as the temperature rises. The slimmer the design of the tapered transition region between the space and the bearing gap and the higher the viscosity of the bearing fluid, the better is the sealing effect of this arrangement.

For bearing systems open at one end, and particularly for those open at two ends, the problem may arise that some air bubbles trapped in the bearing fluid could accumulate at certain points in the bearing gap, due to the centrifugal effects of the rotating bearing parts and the pressure gradients in the bearing fluid thus produced. These accumulations of air can no longer be transported towards the outside through the openings in the bearing gap but rather migrate inwards in the direction of the fluid dynamic bearing. A further problem is caused by air bubbles that are transported with the flow of fluid through the recirculation channel. These air bubbles may have to overcome steps or edges in transition from the recirculation channel to the sealing gaps, which frequently results in air accumulating in these transition regions and thus impairing the functioning of the bearing. This effect may even lead to the breakdown of the bearing.

Both axial bearings pump the bearing fluid inwards, however, due to the strong asymmetry of the lower radial bearing, the fluid is pumped upwards along the bearing gap between the shaft and the bearing bush, and in the upper axial bearing region it flows radially outwards and downwards through the recirculation channel and is finally pumped radially inwards again by the lower axial bearing.

Particularly for bearing systems open at two ends, there exists the further problem of adjusting the circulation of bearing fluid in the bearing gap and in the recirculation channel, if applicable, such that an equilibrium of pressure is produced so that the bearing fluid can on no account leak out of either of the capillary seal. What is more, there is the risk of air penetrating into the bearing system in the region of the capillary seal. To some extent, air bubbles found in the bearing gap may accumulate at certain points in the bearing gap due to the centrifugal effects of the rotating bearing parts and through pressure gradients in the bearing fluid thus produced. These accumulations of air can no longer be transported towards the outside through the openings in the bearing gap, but rather migrate inwards in the direction of the fluid dynamic bearing. These air bubbles in the bearing gap impair the function of the bearing and could lead to the breakdown of the bearing.

SUMMARY OF THE INVENTION

It is the object of the present invention to provide a fluid dynamic bearing system in which measures have been taken to improve the elimination of any air contained in the bearing fluid.

A further object of the invention is to provide a fluid dynamic bearing system that possesses means of effectively deairing the recirculation channel.

Finally, a further object of the invention is to provide a fluid dynamic bearing having a bearing gap open at both ends in which improved pressure equilibrium in the bearing gap and improved retention of the bearing fluid is realized.

This object has been achieved by a fluid dynamic bearing system that comprises at least one stationary part which has a shaft and two bearing plates, an upper and a lower bearing plate, disposed on the shaft at a mutual spacing. At least one rotating part is provided that is supported so as to rotate about a rotational axis with respect to the stationary part, and comprises a bearing bush and a sleeve enclosing the bearing bush, the bearing bush being rotatably disposed on the shaft between the bearing plates. A bearing gap is formed between the opposing bearing surfaces of the stationary and the rotating part and separates the opposing surfaces of the shaft, the bearing bush, the bearing plates and the sleeve from one another. At least one sealing gap for sealing the bearing gap that runs concentric to the rotational axis is provided, the sealing gap being proportionately filled with bearing fluid. The bearing comprises at least one fluid dynamic radial bearing and at least two fluid dynamic axial bearings, and at least one recirculation channel. In accordance with the invention, the largest radial diameter R3 of the recirculation channel is greater than or equal to the largest radial diameter R2 of the sealing gap and the smallest radial diameter R4 of the recirculation channel is greater than or equal to the largest radial diameter R1 of a bearing surface of the adjoining upper and/or lower bearing plate.

These measures ensure that any air bubbles contained in the bearing fluid are directly conducted in the direction of the sealing gap and there, through both centrifugal effects as well as through the flow of bearing fluid in the direction of the rotational axis, can be carried towards the outside into environment and thus be conducted out of the bearing.

The bearing system may either be a bearing system open at one end or a system open at two ends. In the case of a bearing gap having two open ends, both ends may be sealed by a sealing gap. The sealing gap may take the form of a capillary seal, the sealing gap being tapered, widening conically from the bearing gap.

It is preferable if the sealing gap does not extend exactly parallel to the rotational axis of the bearing, but extends rather at an angle of 0° to 45° to the rotational axis. Starting from the bearing gap, the diameter of the parts defining the sealing gap becomes smaller, which applies to both the outside diameter as well as to the inside diameter of the parts defining the sealing gap, whereas the gap width of the sealing gap increases.

The sealing gap may likewise form a part of a fluid dynamic pumping seal, which is marked by pumping patterns on the surface of the sleeve or of the thrust plate respectively.

The bearing system preferably comprises two radial bearings that are formed by adjoining surfaces of the shaft and the bearing bush that are separated from one another by the bearing gap. The radial bearings have familiar grooved patterns that are provided on the surface of the shaft or of the bearing bush. The grooved patterns preferably run from a separator region disposed between the radial bearings up to the end faces of the bearing bush.

However, it is also possible for the bearing grooves of the radial bearing not to reach as far as the respective end face of the bearing bush, but rather for an axial region having a narrow bearing gap without bearing grooves to remain between the end of the radial bearing and the end face of the bearing bush (called a quiet zone).

Moreover, the bearing system according to the invention comprises a first axial bearing that is formed by the opposing surfaces of the end faces of the upper bearing plate and of the bearing bush and a second axial bearing that is formed by the opposing surfaces of the end faces of the lower bearing plate and of the bearing bush. The axial bearings likewise have grooved patterns that preferably run from an outer rim of the end faces of the bearing bush or of the bearing plates respectively up to an inner rim of the end faces of the bearing bush or of the bearing plates respectively.

Another embodiment provides that the bearing grooves of the axial bearing run from an outer rim of the end face of the bearing bush or of the bearing plates, not, however, as far as an inner rim adjacent to the shaft of the respective parts, but rather that in the radially inner region there remains an annular region of a narrow bearing gap that is not provided with bearing grooves (called the seal belt).

The sleeve that encloses the bearing bush has a middle region and two rim regions. It is preferable if the inner diameter of the sleeve, at least in one rim region, is smaller than the inner diameter of the middle region. There is a step at the upper rim region of the sleeve that is led radially outwards. Consequently, the sleeve is slanted inwards in the direction of the rotational axis at least in one rim region, so that the outer boundary of the sealing gap is also slanted inwards in the direction of the rotational axis. In a similar manner, the diameter of the respective bearing plates may vary over the length of the adjoining sealing gap, the bearing plates in the region of the bearing gap having a larger diameter than in the opposing region. In this way, the fluid is pressed into the interior of the bearing due to centrifugal forces. However, it is also possible for the inside diameter of the sleeve to remain constant in the region of the sealing gap.

The recirculation channel that connects the two axial bearing regions with one another may be provided, for example, on the outside surface of the bearing bush. However, it is preferable if the recirculation channel is located on the inside surface of the sleeve or even on the outside surface of the sleeve, so that its diameter is preferably greater than the diameter of the sealing gaps and of the bearing plates.

Both axial bearings pump the bearing fluid inwards, however, due to the strong asymmetry of the lower radial bearing, the fluid is pumped upwards along the bearing gap between the shaft and the bearing bush and in the upper axial bearing region it flows radially outwards and then downwards through the recirculation channel and is finally pumped radially inwards again by the lower axial bearing.

The recirculation channel may run straight and parallel to the rotational axis, although it may preferably run like a spiral about the surface of the respective bearing part, where the recirculation channel extends such that, seen from the direction of the flow of fluid, it runs in the opposite direction to the rotational direction of the bearing bush.

This results in the flow of fluid being supported by the inertial force of the fluid. The fluid is pressed by centrifugal forces into the recirculation channel and a stable flow of fluid is produced in the recirculation channel. In order to additionally control the flow of fluid in the recirculation channel, the width or even the depth of the recirculation channel may vary over its length. The flow rate or pressure in the recirculation channel may thus be controlled over its length.

In a further preferred embodiment of the invention, a fluid dynamic bearing system is proposed which comprises at least one stationary part that has a shaft and two bearing plates, an upper and a lower bearing plate, disposed on the shaft at a mutual spacing. At least one rotating part is provided that is supported so as to rotate about a rotational axis with respect to the stationary part and comprises a bearing bush and a sleeve enclosing the bearing bush, the bearing bush being rotatably disposed on the shaft between the bearing plates. A bearing gap is formed between the opposing bearing surfaces of the stationary and the rotating part and separates the opposing surfaces of the shaft, the bearing bush, the bearing plates and the sleeve from one another. At least one sealing gap for sealing the bearing gap that runs concentric to the rotational axis is provided, the sealing gap being proportionately filled with bearing fluid. The bearing comprises at least one fluid dynamic radial bearing and at least two fluid dynamic axial bearings, and at least one recirculation channel.

Additional and effective deairing of the recirculation channel is achieved by a venting device that is disposed in the region of the axial end of the recirculation channel and the adjoining sealing gap. The venting device comprises a slanted annular space tapered radially outwards and downwards that runs into the radially outwards adjoining sealing gap.

The fluid dynamic bearing has a stationary shaft and is open at two ends. A pumping seal may be provided at the upper end, the pumping seal being located between the outside circumference of the upper bearing plate and the opposing inner wall of the bearing sleeve. If the bearing bush and the bearing sleeve are formed as two parts, a recirculation channel is provided by a groove, for instance, in the outer wall of the bearing bush and/or in the inner wall of the bearing sleeve.

It is of course clear, that the bearing bush and the bearing sleeve may also be formed integrally as one piece; in this case, the recirculation channel is realized by a bore in the bearing bush. In addition, the bearing has two asymmetric radial bearings (herringbone pattern) as well as two axial bearings taking the form of spiral grooves that, alongside the load carrying-capacity of the bearing, produce a defined pumping direction of the fluid through the bearing gap as well as through the recirculation channel such that, irrespective of the spatial arrangement of the bearing and irrespective of manufacturing tolerances, the fluid in the illustrated representation of the bearing flows through the recirculation channel from the top in a downward direction. At the same time, any outgassing air in the bearing is carried along, with the idea that the air is discharged at the lower end of the bearing through the conically widening sealing gap that acts as a capillary seal. To ensure that the air leaving the recirculation channel cannot enter the axial bearing region, the distance of the inner wall of the recirculation channel with respect to the rotational axis is greater than the radius of the outside edge of the lower bearing plate at the level of the axial bearing.

In addition, the outflow of the recirculation channel is preferably disposed axially below the level of the axial bearing. This goes to prevent any outgassing air within the fluid from entering into the axial bearing region, which, on sufficient accumulation of air, at the latest when a complete circle of air has been formed, will result in the breakdown of the bearing, because, in this event, the axial bearing surfaces will come into dry, i.e. non-lubricated, contact.

Axially below the level of the axial bearing, the lower bearing plate has a slant, thus producing a conical widening of the bearing, which forms an angle with the opposing bearing bush or sleeve of approximately 2° to 15°, preferably approximately 4°-10°. Adjoining this there is a similarly tapered, mainly vertically extending sealing gap between the lower bearing plate and the bearing bush or sleeve, the sealing gap acting as a capillary seal and having a cone angle of approximately 1°-10°, preferably approximately 2° to 5°, the cone widening towards the outside of the bearing. Most preferably, not only the outer wall of the bearing bush but also the inner wall of the bearing sleeve or of the bearing bush is inclined inwards, i.e. the outside diameter of the lower bearing plate as well as the inside diameter of the bearing bush or sleeve, apart from the upper region of the slant, decrease continuously in the direction towards the outside of the bearing, wherein in this region the angle of inclination of the bearing plate with respect to the rotational axis is greater than the angle of inclination of the bearing bush or sleeve, so that all in all there remains a tapered opening widening towards the outside.

A further problem area involves the high bearing friction at start up of the bearing, particularly in the region of the axial bearings. This can be reduced by taking the following measures: the axial bearing grooves are preferably made less than 10 micrometers deep. Moreover, the region of the axial bearing surfaces lying radially inwards and adjacent to the shaft is not provided with deeper set bearing grooves (called the seal belt). The axial bearing gap is preferably approximately 5-20 micrometers, most preferably 8-15 micrometers. In addition, a region is provided in the radially outwards region of the axial bearings that opens the axial bearing gap further by approximately 20 micrometers (called the pad area). It is preferable if both the radial bearing patterns as well as the axial bearing patterns are provided in the bearing bush, although these may of course be provided in the respective opposing bearing plates as well as in the shaft. Moreover, the radial bearing grooves do not reach into the transition region to the axial bearings (no break through), but rather here there is again a region that is free of deeper set radial bearing grooves (called the quiet zone).

These measures go to ensure that the build up of pressure in the axial bearings takes place more rapidly and that the axial bearings consequently achieve their load-carrying capacity more rapidly, thus in turn resulting in lower bearing friction at start up of the bearing.

In a third preferred embodiment of the invention, a fluid dynamic bearing system is provided that comprises at least one stationary part that has a shaft and two bearing plates, an upper and a lower bearing plate, disposed on the shaft at a mutual spacing. At least one rotating part is provided that is supported so as to rotate about a rotational axis with respect to the stationary part and comprises a bearing bush and a sleeve enclosing the bearing bush, the bearing bush being rotatably disposed on the shaft between the bearing plates. A bearing gap is formed between the opposing bearing surfaces of the stationary and the rotating part and separates the opposing surfaces of the shaft, the bearing bush, the bearing plates and the sleeve from one another. At least one sealing gap for sealing the bearing gap that runs concentric to the rotational axis is provided, the sealing gap being proportionately filled with bearing fluid. The bearing comprises at least one fluid dynamic radial bearing and at least two fluid dynamic axial bearings, and at least one recirculation channel.

To realize improved equilibrium of pressure in the bearing gap and improved retention of the bearing fluid, it is proposed to incline the sealing gaps, at least in sections, at an angle $\alpha$, $\beta$ with respect to the rotational axis, angle $\alpha$ of the sealing gap located upstream of the prevailing direction of flow of the bearing fluid in the recirculation channel being greater than angle $\beta$ of the sealing gap located downstream. The two angles $\alpha$, $\beta$ may lie between 0°-90°.

The measures described above go to ensure that on operation of the bearing, the centrifugal force acting on the bearing fluid generates pressures of varying strengths in the two sealing gaps. In one sealing gap in particular, a relatively large pressure based on a centrifugal force is generated that counteracts the pressure generated in the radial bearing remote from this sealing gap. In this way, equilibrium of pressure is maintained in the bearing gap.

The invention is described in more detail below on the basis of the drawings. Further characteristics and advantages of the invention can be derived from the drawings and their description.

DESCRIPTION OF PREFERRED EMBODIMENTS OF THE INVENTION

Figure 1:
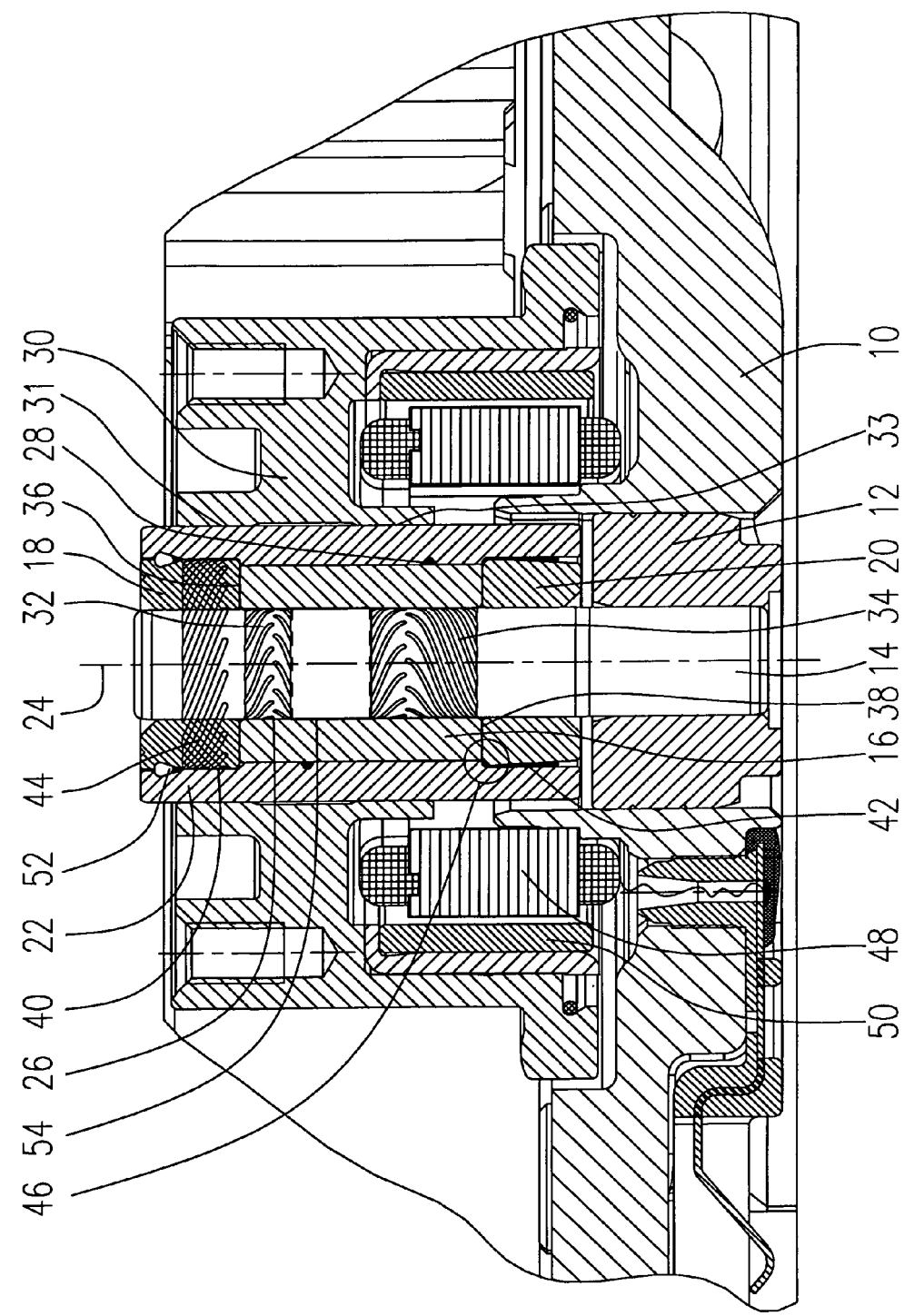
FIG. 1 shows a schematic sectional view of a spindle motor having a first embodiment of the fluid dynamic bearing system.

FIG. 1 shows a schematic sectional view of a spindle motor for driving a hard disk drive having a first embodiment of the fluid dynamic bearing system according to the invention.

The spindle motor comprises a stationary baseplate 10. A holding bush 12 is disposed in an opening in the baseplate 10 and fixedly connected to the baseplate 10. A stationary shaft 14 is fixed in the holding bush 12. An annular lower bearing plate 20 is disposed on the lower region of the shaft 14 facing the holding bush 12. A second annular upper bearing plate 18 is disposed at the upper free end of the shaft 14 at a distance from the lower bearing plate. The two bearing plates 18 and 20 are fixedly connected to the shaft 14. A bearing bush 16 is disposed in an intermediate space formed by the two bearing plates 18, 20. The bearing bush 16 has a central bore for receiving the shaft 14 and is supported on the shaft 14 so as to rotate about a rotational axis 24. The bearing bush 16 has an inside diameter that is slightly greater than the outside diameter of the shaft 14, and a length that is slightly shorter than the length of the intermediate space between the two bearing plates 18 and 20. A bearing gap 26 thereby remains between the opposing surfaces of the shaft 14, the bearing plates 18 and 20 and of the bearing bush 16, the bearing gap being filled with a bearing fluid, preferably a bearing oil. A sleeve 22 is disposed at the outside circumference of the bearing bush 16, the sleeve being fixedly connected to the bearing bush 16. The length of the sleeve 22 is greater than the length of the bearing bush 16. As a result of this, the two ends of the sleeve 22 protrude beyond the ends of the bearing bush 16.

The inside diameter of the sleeve 22 is slightly greater than the outside diameter of the two bearing plates 18, 20. This results in a sealing gap 40, 42 remaining between the respective sleeve surfaces of the bearing plates 18, 20 and the inside surface of the sleeve 22, the sealing gap being connected to the bearing gap 26 and proportionately filled with bearing fluid. These sealing gaps 40, 42 seal the bearing gap 26 towards the outside.

At least one recirculation channel 28 is preferably provided that runs along the inside diameter of the sleeve 22 and is defined by the surfaces of the sleeve 22 and of the bearing bush 16. The recirculation channel 28 connects the section of the bearing gap 26 that extends radially between the upper bearing plate 18 and the end face of the bearing bush 16 to the section of the bearing gap 26 extending radially between the lower bearing plate 20 and the other end face of the bearing bush 16 and ensures adequate circulation of bearing fluid in the bearing gap 26. The recirculation channel 28 may be designed as a straight channel or preferably as a spiral-shaped channel 26 that runs like a thread on the inside surface of the sleeve 22.

The bearing bush 16 and the sleeve 22 together form the moving part of the bearing system, whereas the shaft 14, the holding bush 12 and the two bearing plates 18, 20 form the stationary part of the bearing system.

The illustrated bearing arrangement preferably comprises two radial bearings 32 and 34. The radial bearings 32, 34 are formed by the adjoining surfaces of the shaft 14 and of the bearing bush 16 separated from each other by the bearing gap 26, and are marked by pressure-generating surface patterns, such as grooved patterns. The surface patterns are formed on at least one of the paired bearing surfaces, such as the inner surface of the bearing bush 16. These surface patterns could of course also be disposed on the corresponding opposing surface of the shaft 14. As soon as the rotatable bearing bush 16 is set in rotation, fluid dynamic pressure is built up in the interior of the bearing gap 26 due to the surface patterns, thus giving the radial bearings 32, 34 their load-carrying capacity.

The radial bearings 32, 34 are separated from one another by a separator 54. The separator 54 is a widened section of the bearing gap. The pumping direction of the bearing fluid can be determined by the number and size (length) of the bearing patterns as well as by their orientation. In the illustrated embodiment, the bearing patterns of the radial bearings 32, 34 form two sections lying one above the other which each exert a pumping effect on the bearing fluid directed in the opposite direction. Because the bearing grooves of the respective sections have differing lengths, their pumping effect also differs in strength.

The axial loads of the bearing system are absorbed by at least two axial bearings 36 and 38, working in opposite directions to one another. The first axial bearing 36 is formed by the opposing surfaces of the end faces of the upper bearing plate 18 and of the bearing bush 16. The second axial bearing 38 is formed by the opposing surfaces of the end faces of the lower bearing plate 20 and of the bearing bush 16. Like the radial bearings, the axial bearings 36, 38 are also marked by spiral-shaped surface patterns that are formed on at least one of the paired bearing surfaces and that exert a pumping effect on the bearing fluid. The design and shape of the surface patterns is known to a person skilled in the art and thus not shown in further detail in the drawing.

The grooves of the radial bearing 32, 34 preferably run into the outer rim of the bearing bush 16 and into the separator region 54 disposed between the two radial bearings in which the bearing gap 26 is distinctly larger than in the region of the radial bearing itself. The grooves of the axial bearings 36, 38, which are preferably disposed at the top and bottom of the bearing bush 16, preferably also run from the outer rim to the inner rim of the end faces of the bearing bush 16. As a rule, the outer edge of the bearing bush 16 as well as the edge of the bore in the bearing bush 16 are broken or have a chamfer, bevel or a radius. Both the axial bearing grooves and the radial bearing grooves on the side near the end run into these regions.

The hub 30 of the spindle motor is fixed to the sleeve 22. The hub 30 is fixed to the sleeve 22 using, for example, an interference fit or a welded joint. If the spindle motor is utilized in a disk drive, the hub 30 carries one or more storage disks (not illustrated) and drives them in rotation. The hub 30 preferably has an upper connecting region 31 as well as a lower connecting region 33 that directly abut the sleeve 22, there remaining a region located between these two which has no direct interaction with the sleeve. This region has a recess.

Moreover, the lower connecting region 33 preferably extends so far downwards in an axial direction that the lower end of this region is positioned radially within the stator stack. Alongside a long joint length and thus a particularly strong connection of hub and sleeve, this goes to ensure that the bearing region does not buckle due to the different thermal expansion of the hub made of aluminum and of the bearing bush or sleeve made of steel.

The electro-magnetic components needed to operate the spindle motor are disposed on the baseplate 10 or on the hub 30 respectively. The baseplate 10 carries a stator arrangement 48 consisting of a plurality of stator windings that are wound onto ferromagnetic pole plates. The stator windings are enclosed at a short distance by an alternately magnetized annular permanent magnet 50 that is fixed either to the hub 30 or to a yoke disposed on the hub 30.

An open end of the bearing gap 26 is sealed by the sealing gap 40 that extends between the sleeve 22 and the outside diameter of the upper bearing plate 18. The sealing gap 40 is partly filled with bearing fluid and acts as a capillary seal. The static effect of the capillary seal may be reinforced by further sealing means. For example, an additional dynamic pumping seal 44 may be provided. To this effect, the outside diameter of the upper bearing plate 18, for example, may be provided with appropriate surface patterns that, on rotation of the sleeve 22, exert a pumping effect on the bearing fluid directed in the direction of the bearing gap 26.

Furthermore an oil reservoir 52 is preferably provided at the end between the upper bearing plate 18 and the sleeve 22, the reservoir first widening conically, the taper acting as a capillary seal, and then narrowing again towards the end to form a narrow gap.

The other open end of the bearing gap is sealed by the sealing gap 42 that extends between the sleeve 22 and the outside diameter of the lower bearing plate 20. The sealing gap 42 is proportionately filled with bearing fluid and acts as a capillary seal. This capillary seal is preferably designed as a tapered capillary seal in which the sealing gap 42 widens conically towards the outside. To this effect, the lower bearing plate 20 has a conical contraction at its outside diameter, so that a tapered space is formed between the lower bearing plate 20 and the sleeve 22.

In a preferred embodiment of the invention, provision can be made for the inner wall of the sleeve 22 in the region of the sealing gap 42 to be inclined slightly inwards in its course to the lower end of the bearing, such that the lower bearing plate 20 can still be mounted. The outer wall of the lower bearing plate 20 is likewise inclined slightly inwards in its course to the lower end of the bearing, so that the sealing gap 42 widens conically outwards. I.e. the angle to the rotational axis 24 by which the inner wall of the sleeve 22 is inclined is smaller than the angle by which the outer wall of the lower bearing plate 20 is inclined.

According to the invention, measures are now taken to prevent air from accumulating in the bearing gap 26 and to provide the air with means of escaping via the lower sealing gap 40, 42. Here, the largest radial diameter of the recirculation channel 28 is at least the same size as the largest diameter of at least one sealing gap 42. At the same time, the smallest radial diameter of the recirculation channel 28 is at least the same size as the largest diameter of the adjoining lower bearing plate 20. These measures mean that there is no edge or step extending radially outwards at the transition between the recirculation channel 28 and the sealing gap 42. On rotation of the bearing, the bearing fluid in the recirculation channel 28 as well as in the sealing gap 42 is pressed radially outwards by centrifugal forces, any air contained in the bearing fluid being automatically displaced radially inwards. If the diameter of the recirculation channel 28 were smaller than the diameter of the sealing gap 42, air bubbles would accumulate at the edge thus formed in region 46, the air bubbles being unable to escape outwards out of the bearing. However, due to the aligned or radially outwards arrangement of the recirculation channel with respect to the sealing gap and the consequent avoidance of an edge extending radially outwards in the region of transition 46, the air may now pass from the recirculation channel 28 into the sealing gap and escape from the bearing.

The upper sealing gap 40 merges into the recirculation channel 28 via a step that extends radially outwards. However, no air can escape here anyway since a pumping seal 44 is provided that exerts a pumping effect directed towards the interior of the bearing, the pumping effect being exerted on both the bearing fluid as well as on the air. Any bearing fluid leaking from the sealing gap 40 is collected in a reservoir 52 and cannot reach the outside.

Figure 2:
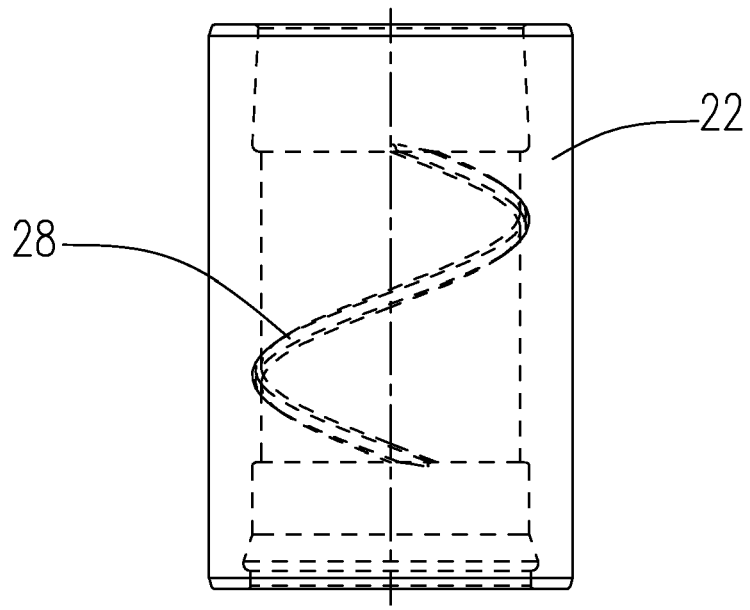
FIG. 2 shows a side view of the sleeve of the bearing system, the hidden edges and the recirculation channel being indicated.
Figure 3:
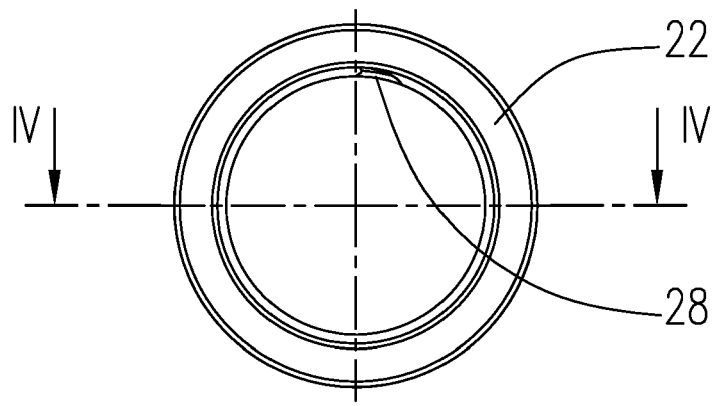
FIG. 3 shows a view of the sleeve from above wherein the intake opening of the recirculation channel can be seen.
Figure 4:
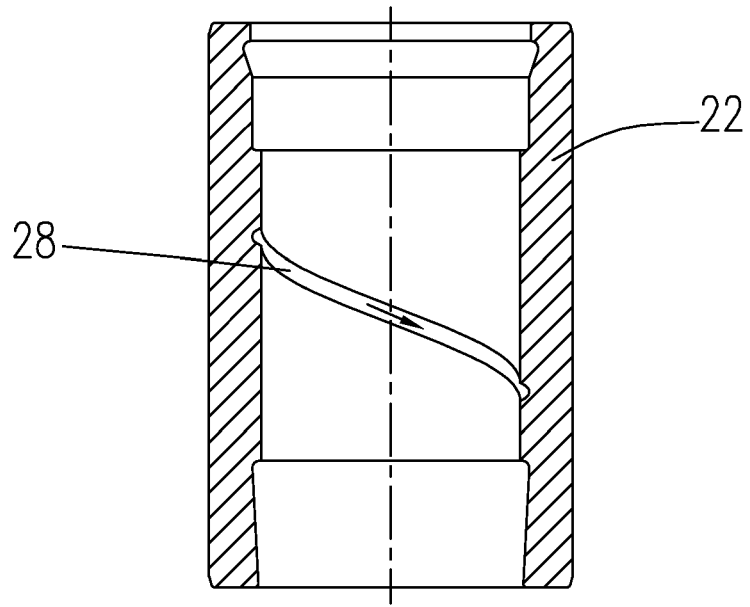
FIG. 4 shows a cross-sectional view IV-IV of FIG. 3 depicting the sleeve having a recirculation channel at the inner surface.

In FIGS. 2 to 4, the sleeve 22 is shown in various views. The preferably spiral-shaped recirculation channel 28 running on the inside diameter can be seen. The ends of the recirculation channel 28 open at an acute angle to the plane of the bearing plates accommodated in the sleeve 22. This goes to facilitate the inflow or outflow of the bearing fluid from the axial bearing regions into or out of the recirculation channel 28.

Figure 5:
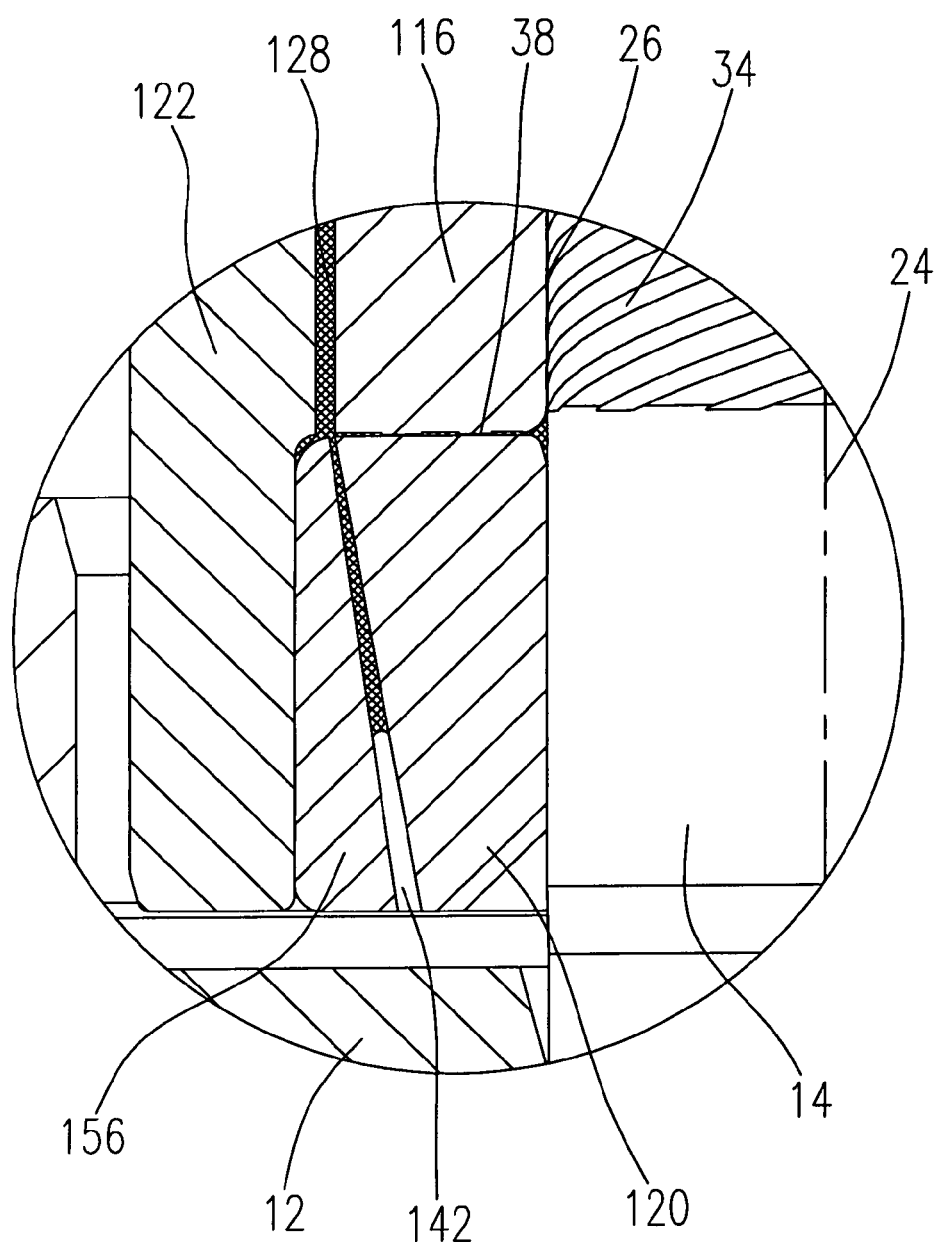
FIG. 5 shows an enlarged view of region 46 from FIG. 1 having a modified embodiment of the sealing gap.

FIG. 5 shows another embodiment of the lower sealing region with the sealing gap 142. Here, the recirculation channel 128 is provided as a straight channel at the inside diameter of the sleeve 122. The lower bearing plate 120 is distinctly slanted at its outside diameter and has, in the region of the axial bearing 38, an outside diameter that corresponds approximately to the inside diameter of the recirculation channel 128.

At the inside circumference of the sleeve 122, another part taking the form of an annular insert 156 is now provided whose inside circumference is likewise slanted, the sealing gap 142 being defined between the inside circumference of the annular insert 156 and the outside circumference of the lower bearing plate 120. This sealing gap 142 is tapered, widening from the bearing gap 26 and overall inclined at an acute angle to the rotational axis 24 of the bearing. This goes to facilitate the elimination of air out of the bearing fluid found in the sealing gap 42. Due to the centrifugal forces arising on rotation of the bearing, the bearing fluid is pressed in a radially outwards direction, i.e. towards the annular insert 156, whereas the air is pressed in the opposite direction, i.e. towards the outside diameter of the lower bearing plate 120. Due to the slanted surface of the bearing plate 120, the air is automatically transported downwards out of the bearing. Due to the pumping patterns of the adjacent axial bearing 38, an increase in pressure in a radial direction from the outside towards the interior of the bearing is effected, which prevents air from penetrating into the axial bearing gap and thus forms a pressure barrier for the air.

Figure 6:
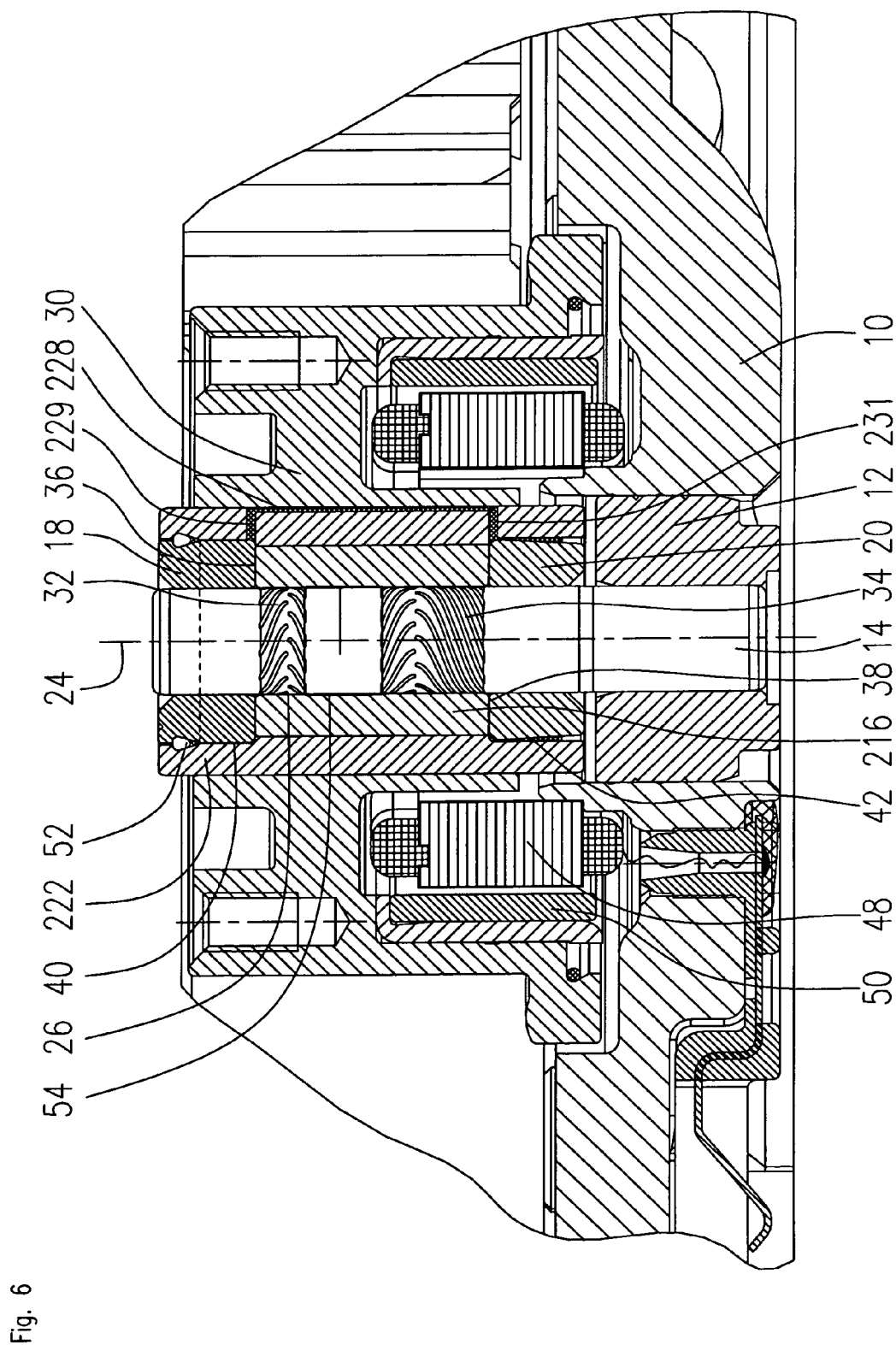
FIG. 6 shows a schematic section through a spindle motor, similar to that in FIG. 1, having an outer recirculation channel.

FIG. 6 shows a spindle motor having a fluid dynamic bearing system that is largely the same as the spindle motor according to FIG. 1. Identical parts are thus indicated by the same reference numbers. In contrast to FIG. 1, in the bearing system according to FIG. 6 the recirculation channel 228 is located on the outside surface of the sleeve 222 between the sleeve and the hub 30. As an alternative, this recirculation channel may also be formed in the inner wall of the hub (30) and extend in almost a straight line or in a spiral shape (helix). By means of appropriate transversal holes 229 and 231, the ends of the recirculation channel 228 are connected directly to the sealing gaps 40 or 42 respectively. Here, the bearing bush 216 is designed completely cylindrical and does not contain a recirculation channel. The recirculation channel 228 is consequently disposed on a larger diameter than the sealing gaps 40 or 42 respectively and likewise has a larger diameter than the bearing plates 18 or 20 respectively. The air contained in the recirculation channel 228 or in the holes 229, 231 is transported by the flow of fluid to one end of the channel 228. Due to centrifugal effects and the flow of fluid, from here the air arrives at the interior, at sealing gap 42 for example, and from there it reaches the outside. It is consequently impossible for a cushion of air, which could lead to the failure of the bearing, to be formed particularly in the axial bearing regions 36, 38.

Figure 7:
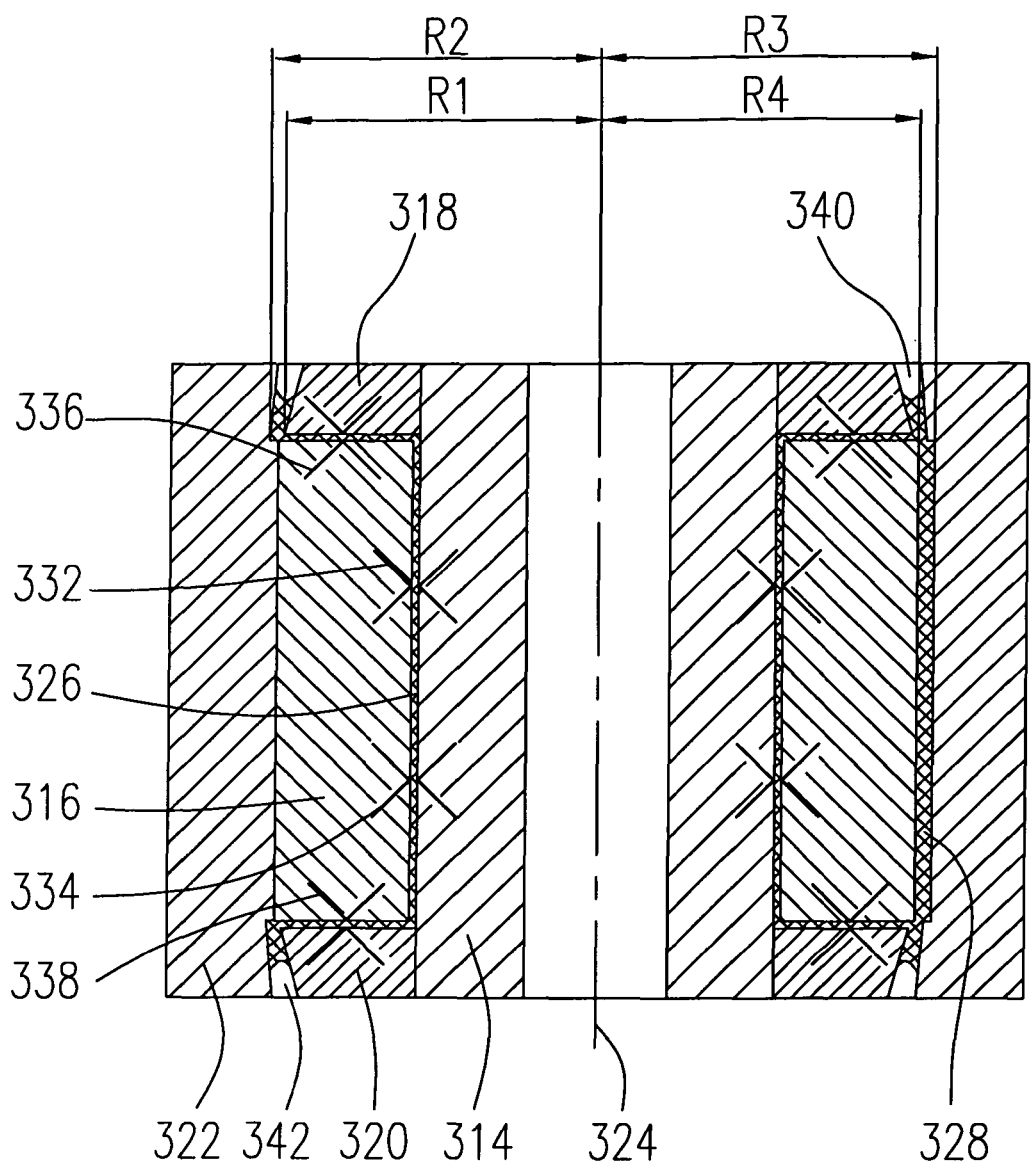
FIG. 7 schematically shows a further embodiment of the invention.

FIG. 7 schematically shows a further embodiment of the invention. Only the bearing system is illustrated. The interior of the bearing is formed by a shaft 314, which, in the embodiment, is designed as a hollow shaft. The shaft 314 may also be referred to as an inner bearing bush. Annular bearing plates 318 and 320 are disposed on the shaft 314 at a mutual spacing from each other, the bearing plates being fixedly connected to the shaft 314. Between the two bearing plates 318 and 320, a bearing bush 316 is disposed so as to rotate about a rotational axis 324 with respect to the shaft. The bearing bush 316 has an inside diameter that is slightly greater than the outside diameter of the shaft 314, and a length that is slightly shorter than the distance between the two bearing plates 318 and 320. A bearing gap 326 filled with a bearing fluid is thereby formed between the adjoining surfaces of the shaft 314, the bearing plates 318 and 320 as well as the bearing bush 316. In the axial section of the bearing gap 326, the bearing system comprises two radial bearing regions 332 and 334. In the radial sections between the end face of the bearing bush 316 and the bearing plates 318 or 320 respectively, axial bearings 336 and 338 are formed. The outside circumference of the bearing bush 316 is fixedly connected to a sleeve 322, the length of the sleeve 322 being greater than the length of the bearing bush. The inside diameter of the sleeve 322 is slightly greater than the respective outside diameter of the two bearing plates 318 and 320. Sealing gaps 340 and 342 are formed between the sleeve surfaces of the bearing plates 318 and 320 and the inside surface of the sleeve 322, the sealing gaps being connected to the ends of the bearing gap 326. These sealing gaps 340 and 342 substantially run in an axial direction and take the form of capillary seals and, at the same time, act as a fluid reservoir. The sealing gaps 340 and 342 extend, for example, at an angle of 0° to 20° to the rotational axis 324. This angle is achieved in that the inside diameter of the surfaces of the sleeve 322 defining the sealing gaps 340 and 342 becomes smaller in the direction of the opening of the sealing gaps, whereas at the same time the outside diameter of the bearing plates 318 and 320 decreases in the direction of the opening of the sealing gaps 340 and 342. The slope of the bearing plates 318 and 320 in the region of the sealing gaps is, however, greater than the slope of the sleeve 322, so that the width of the sealing gap increases in the direction of its opening, the desired capillary effect then ensuing.

At least one recirculation channel 328 is provided that extends substantially parallel to the rotational axis 324 and connects the connecting region between the bearing gap 326 and the sealing gaps 340 and 342. According to the invention, the largest radial diameter R3 of the recirculation channel 328 is greater than the largest diameter R2 of the sealing gaps 340 or 342 respectively. At the same time, the smallest radial diameter R4 of the recirculation channel 328 is likewise greater than the largest radial diameter of the bearing plates 318 and 320. Due to the radially inward slant, i.e. in the direction of the rotational axis 324, of the sealing gaps 340 and 342, any air found in the bearing gap 326 or in the sealing gaps 340 and 342 may escape due to the centrifugal forces acting on the bearing fluid. This effect is reinforced by the recirculation channel 328 located radially far outwards, it also being possible for the air found in the recirculation channel at the transition to the sealing gaps 340 and 342 to easily escape from the bearing.

Figure 8:
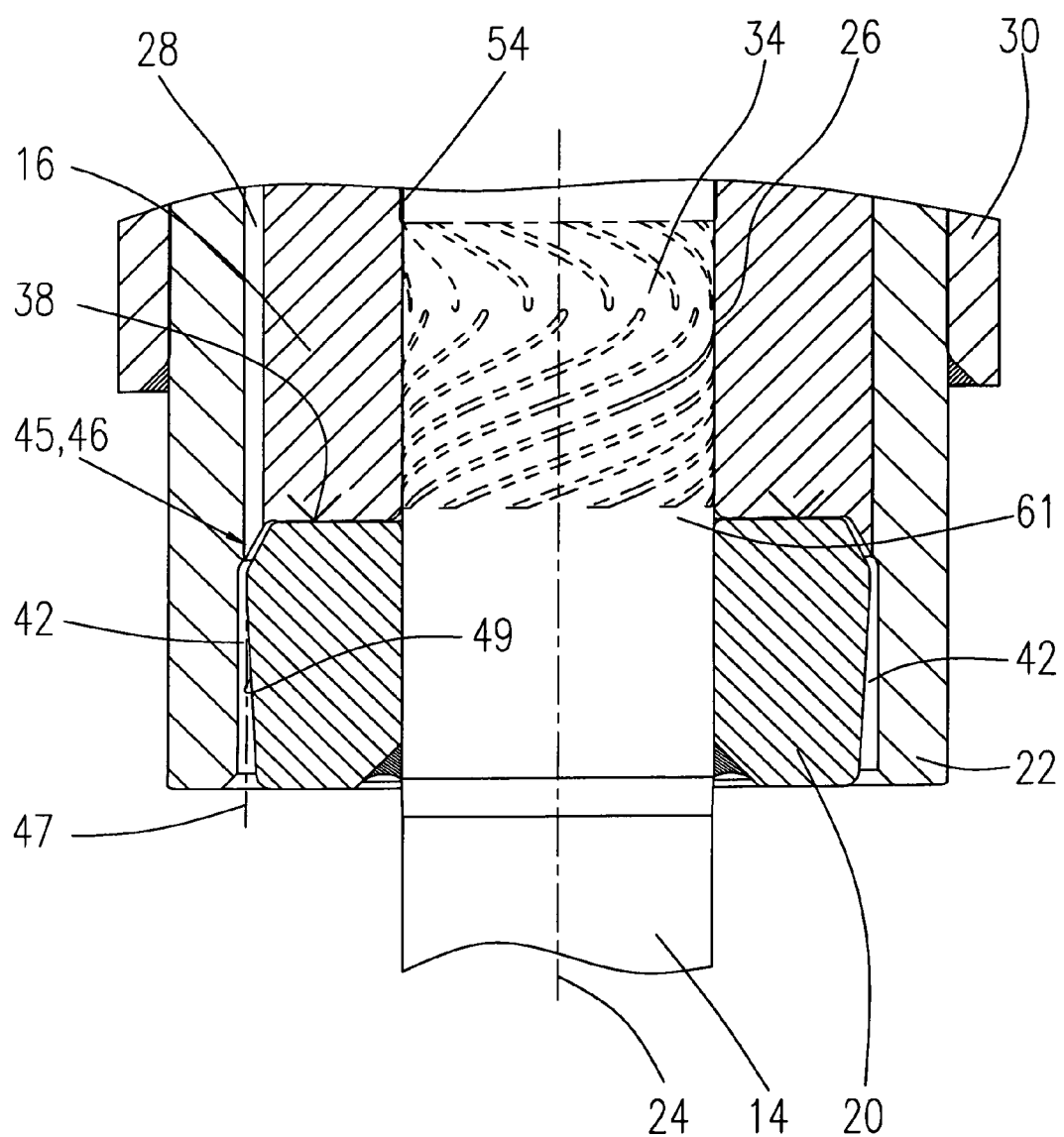
FIG. 8 shows a section through the bearing system in a further embodiment.
Figure 9:
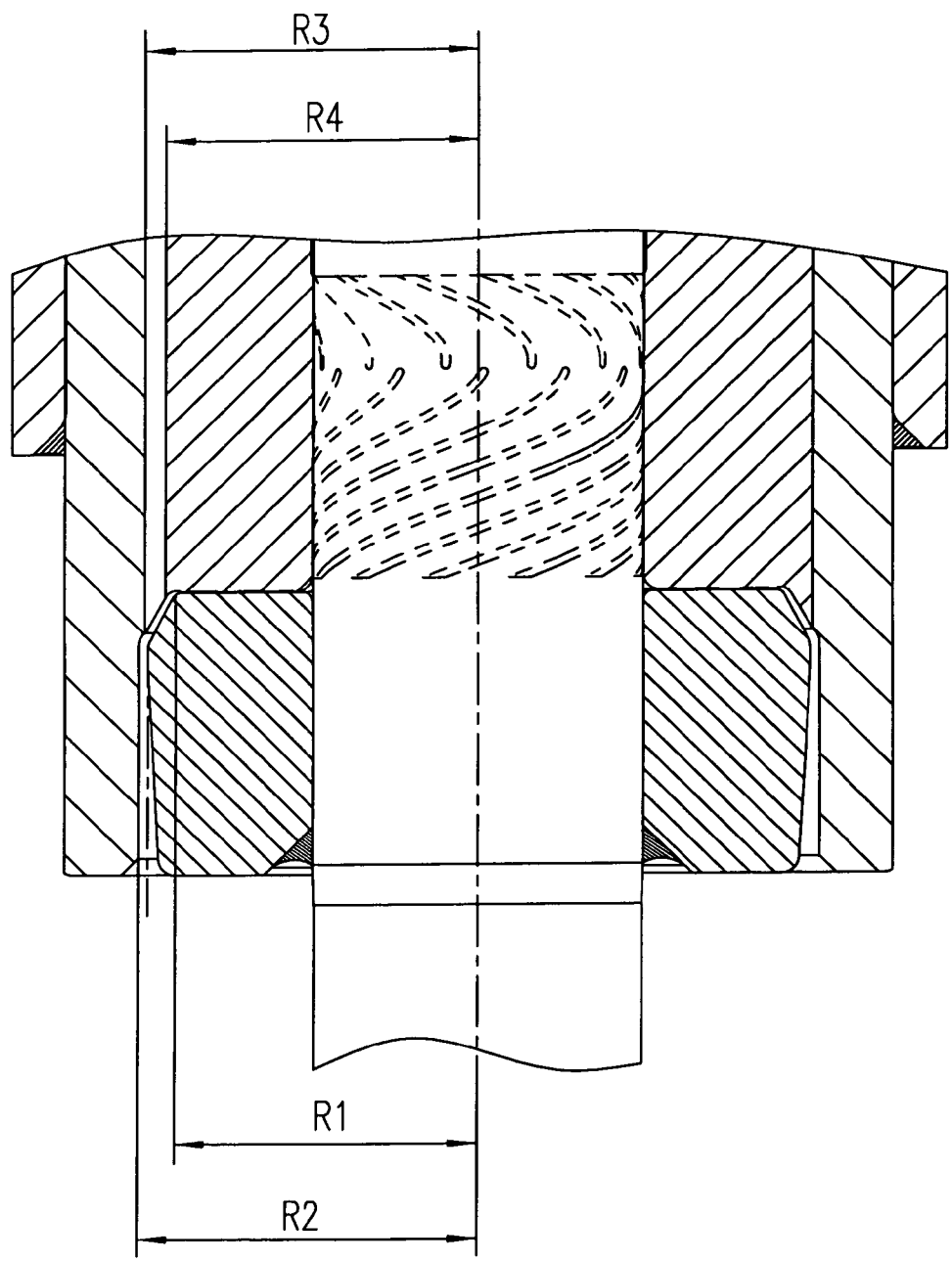
FIG. 9 shows the same view with the same parts as in FIG. 8 with radii.

FIGS. 8 and 9 show a schematic sectional view of a further embodiment of the fluid dynamic bearing system according to the invention.

A first annular lower bearing plate 20 is disposed on the lower region of the shaft 14 facing the holding bush. A second annular upper bearing plate 18 is disposed at the upper free end of the shaft 14 at a distance to the lower bearing plate. The two bearing plates are fixedly connected to the shaft 14. A bearing bush 16 is disposed in an intermediate space formed by the two bearing plates. The bearing bush 16 has a central bore for receiving the shaft 14 and is supported on the shaft 14 so as to rotate about a rotational axis 24. The bearing bush 16 has an inside diameter that is slightly greater than the outside diameter of the shaft 14, and a length that is slightly shorter than the length of the intermediate space between the two bearing plates. A bearing gap 26 filled with a bearing fluid, preferably a bearing oil, thereby remains between the opposing surfaces of the shaft 14, the bearing plates and the bearing bush 16.

At the outside circumference of the bearing bush 16, a sleeve 22 is disposed that is fixedly connected to the bearing bush 16. The length of the sleeve 22 is greater than the length of the bearing bush 16. As a result of this, the two ends of the sleeve 22 protrude beyond the ends of the bearing bush 16. The inside diameter of the sleeve 22 is slightly larger than the outside diameter of the two bearing plates. A sealing gap thereby remains between the sleeve surfaces of the bearing plates and the inner surface of the sleeve 22, the sealing gap being connected to the bearing gap 26 and proportionately filled with bearing fluid. These sealing gaps seal the bearing gap 26 towards the outside.

At least one recirculation channel 28 is preferably provided that runs along the inside diameter of the sleeve 22 and is defined by the surfaces of the sleeve 22 and of the bearing bush 16. The recirculation channel 28 connects the radially extending section of the bearing gap 26 between the upper bearing plate 18 and the end face of the bearing bush 16 to the radially extending section of the bearing gap 26 between the lower bearing plate 20 and the other end face of the bearing bush 16 and ensures adequate circulation of the bearing fluid in the bearing gap 26. The recirculation channel 28 may be designed as a straight channel or preferably as a spiral-shaped channel 26 that runs like a thread on the inner surface of the sleeve 22.

The illustrated bearing arrangement preferably comprises two radial bearings, of which only one radial bearing 34 is illustrated. The radial bearings are formed by the adjoining surfaces of the shaft 14 and the bearing bush 16 that are separated from one another by the bearing gap 26 and are marked by pressure-generating surface patterns, such as grooved patterns. The surface patterns are formed on at least one of the paired bearing surfaces, for example, on the inner surface of the bearing bush 16. These surface patterns may also of course be disposed on the corresponding opposing surface of the shaft 14. As soon as the rotatable bearing bush 16 is set in rotation, fluid dynamic pressure is built up in the interior of the bearing gap 26 due to the surface patterns, thus giving the radial bearing its load-carrying capacity. The radial bearings are separated from one another by a separator 54. The separator 54 is a wider section of the bearing gap.

The axial loads of the bearing system are absorbed by at least two axial bearings acting in opposite directions to one another, of which only one bearing, axial bearing 38, is illustrated. The first—not illustrated—axial bearing is formed by the opposing surfaces of the end faces of the upper bearing plate and of the bearing bush 16. The second axial bearing 38 is formed by the opposing surfaces of the end faces of the lower bearing plate 20 and of the bearing bush 16. Like the radial bearings, the axial bearings are marked by spiral-shaped surface patterns that are formed on at least one of the paired bearing surfaces and that exert a pumping effect on the bearing fluid. The design and shape of the surface patterns is known to a person skilled in the art and thus not shown in more detail in the drawing.

It is preferable if the grooves of the radial bearing do not extend into the outer rim of the bearing bush 16, but do extend into the separator region 54 disposed between the two radial bearings, in which the bearing gap 26 is distinctly larger than in the region of the radial bearing itself. The grooves of the axial bearings as well, which are preferably disposed on the top and bottom of the bearing bush 16, preferably run up to the outer rim, not however, as far as the inner rim of the end faces of the bearing bush 16. As a rule, the outside edge of the bearing bush 16 and the edge of the bore in the bearing bush 16 are broken or have a chamfer, bevel or a radius. The axial bearing grooves and the radial bearing grooves on the side near the end run into these regions.

The rotor hub of the spindle motor is fixed to the sleeve 22. The rotor hub is connected to the sleeve 22 using, for example, an interference fit or a bonded or welded joint. If the spindle motor is utilized in a disk drive, the hub 30 carries one or more storage disks (not illustrated) and drives them in rotation.

The venting device 45 is disposed in the region 46 between the inner wall of the sleeve 22 and the outer wall of the lower bearing plate 20. As mentioned above, the wall 49 of the bearing plate 20 slopes in this region at an angle to the vertical 47. As a result, a tapered sealing gap 42 widening towards the outside is formed that is connected fluid-conductive to the recirculation channel 28 via the venting device 45.

Figure 10:
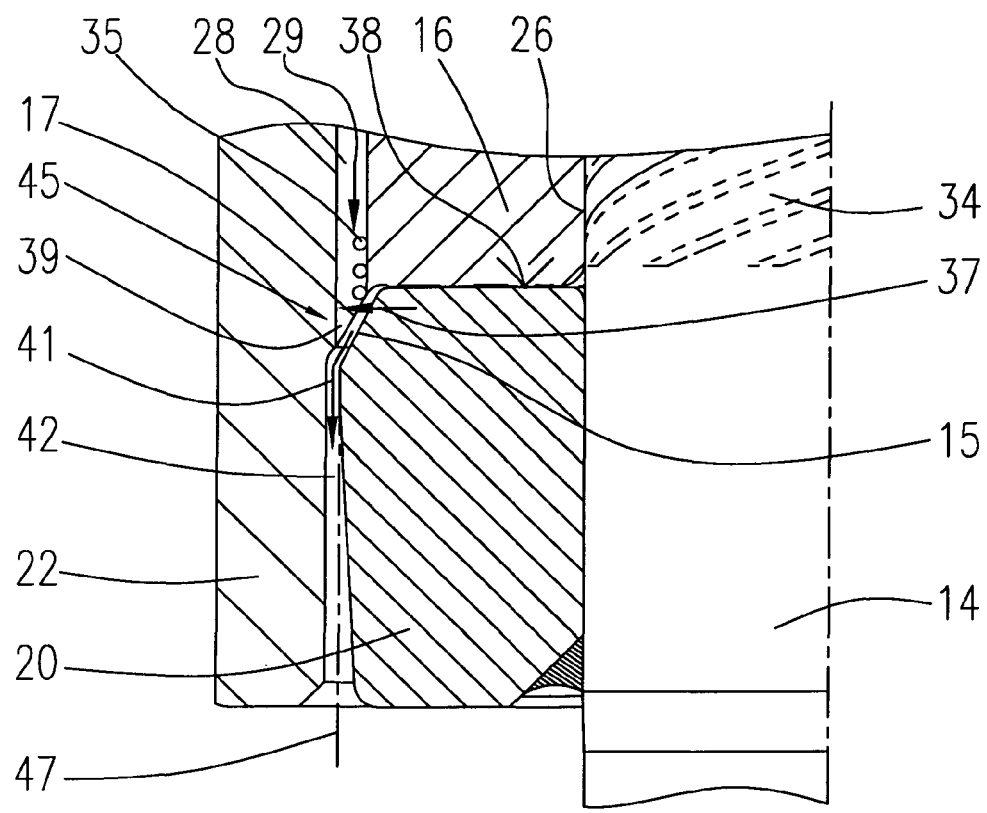
FIG. 10 shows a greatly enlarged detail of FIG. 8 in the left region of the bearing plate.

Further details of the bearing can be derived from the enlarged sectional view in FIG. 10. If air bubbles 35 are carried along with the flow of fluid in the recirculation channel 28 in the direction of arrow 29, they arrive at the varying slanting surfaces 15, 17 of the lower bearing plate 20 and of the bearing bush 16 and are displaced there both radially and axially outwards in the direction of arrow 37. Because of these slanting surfaces 15, 17, on rotation of the sleeve 22, the air bubbles 35 are displaced into the tapered gap 39 between the sleeve 22 and the lower bearing plate 20. They are thus displaced in the direction of arrow 41 into the sealing gap 42 connected in a fluid-conductive manner to the tapered gap and carried off from there towards the outside.

Figure 11:
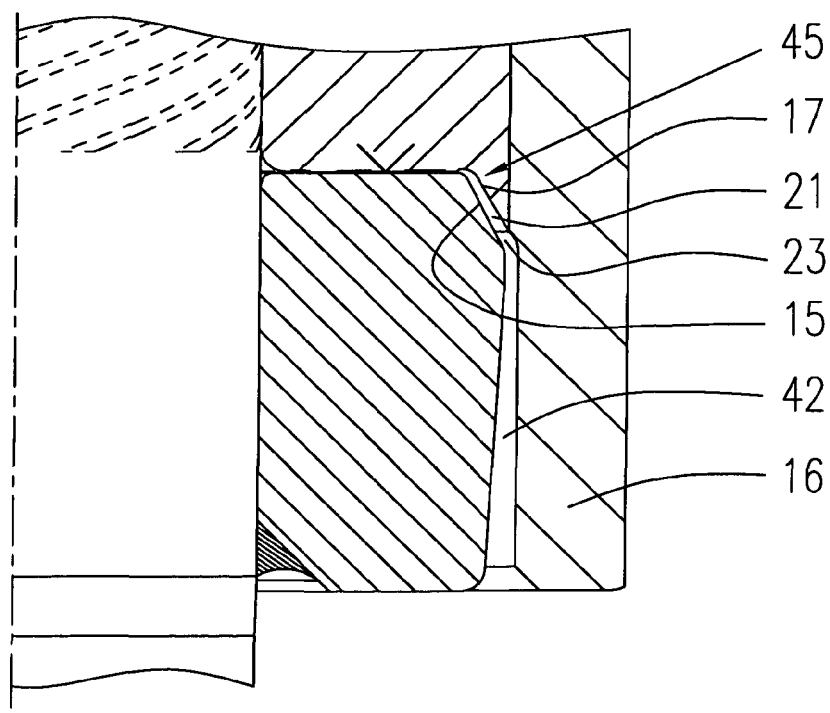
FIG. 11 shows a greatly enlarged detail of FIG. 8 through the right region of the bearing plate.

FIG. 11 shows the enlarged partial section of the right side of the venting arrangement 45. Here it can be seen that the cone angle (angle between the slanting surfaces 15 and 17) of the mouth 23 of the slanting annular space 21 is approximately 6 degrees.

Figure 12:
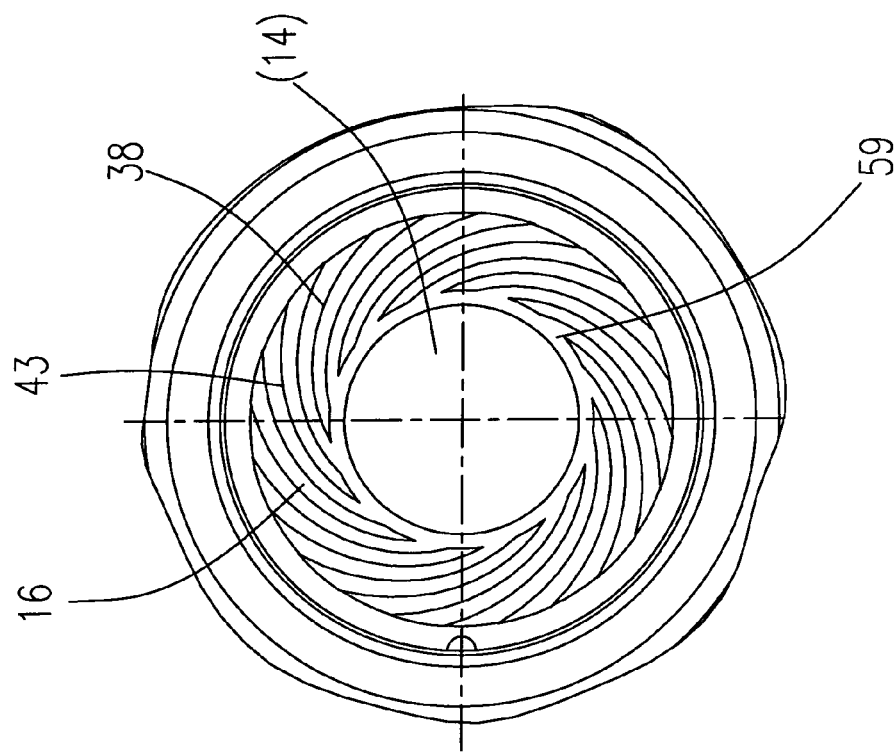
FIG. 12 shows a view from above of the bearing sleeve with the shaft and bearing plate being removed
Figure 13:
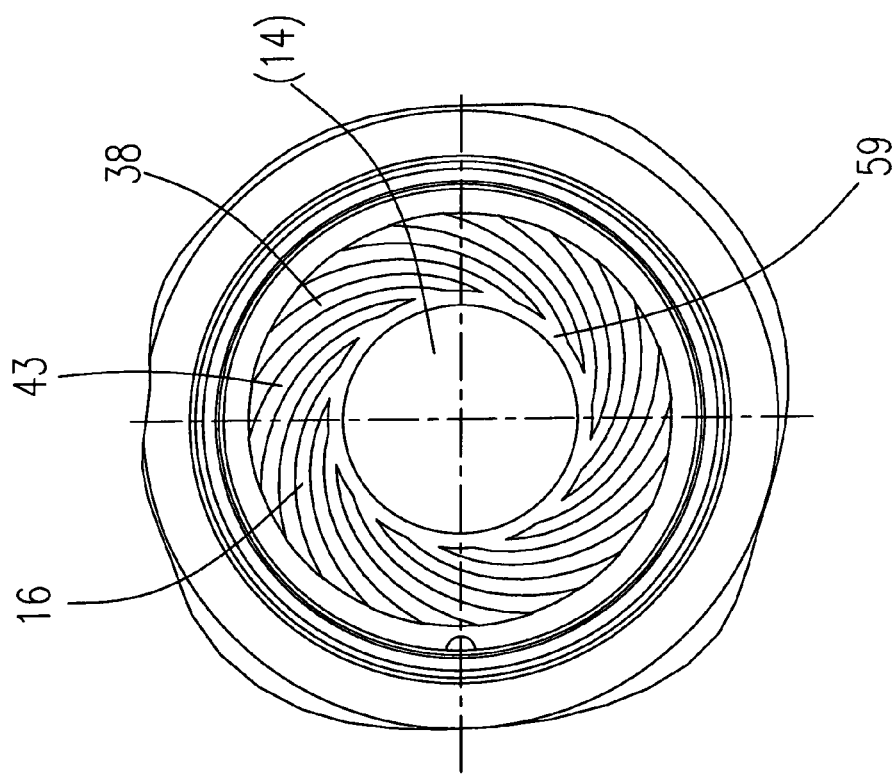
FIG. 13 shows the view from below of the bearing sleeve with the shaft and bearing plate being removed.

FIGS. 12 and 13 show that the carrying patterns 43 of the axial bearings are open towards the outside, in order to generate a pressure flow of fluid that is directed radially inwards. For the sake of clarity, both the shaft 14 and the bearing plates 20 have been removed from the figures so as to show the carrying patterns 43 worked into the bearing bush 16. It can moreover be seen that an annular, non-patterned zone 59 (called the seal belt) free of axial bearing groove patterns 43 is located at the radially inner region of the axial bearing surface 38.

Figure 14:
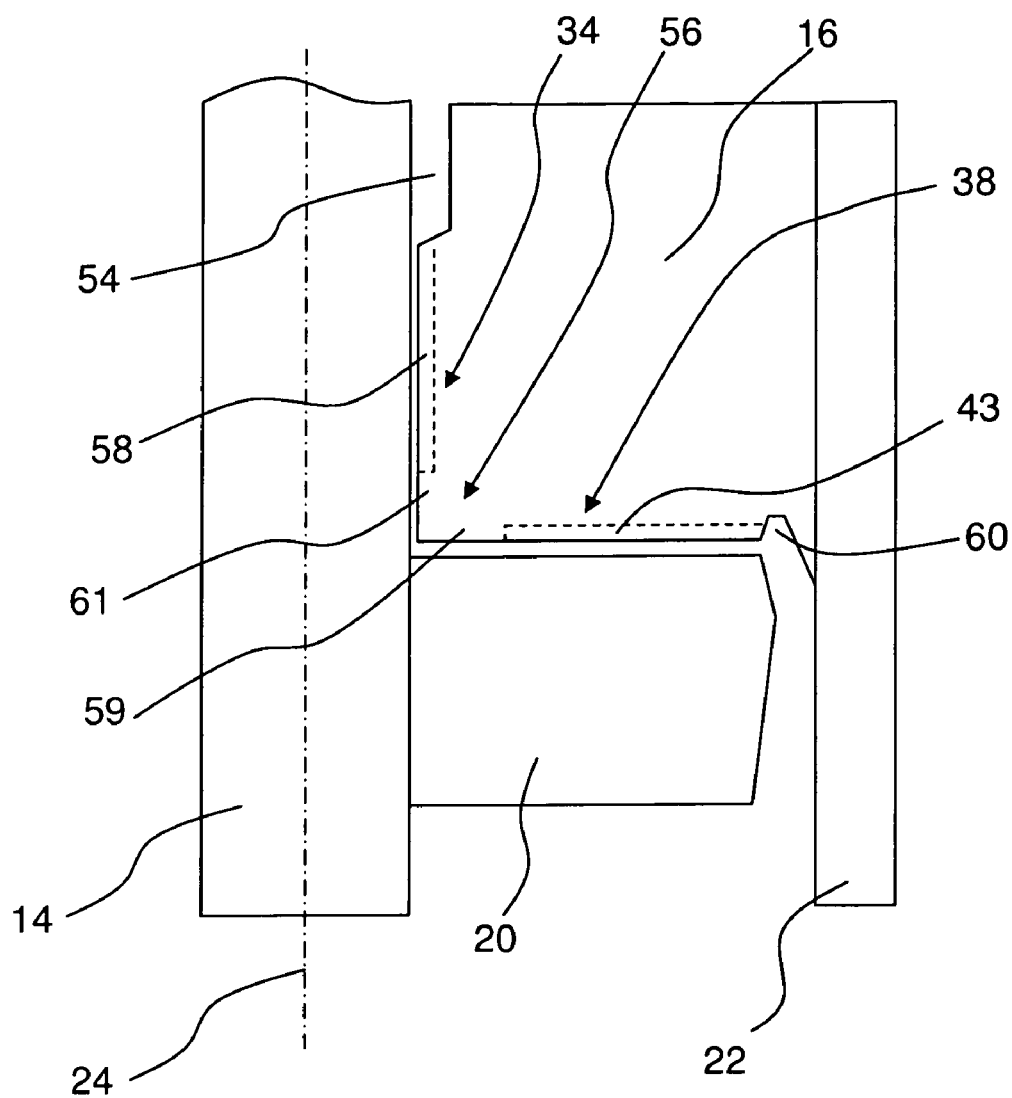
FIG. 14 shows a schematic view of a further embodiment of the bearing.

FIG. 14 shows that the radial bearing grooves 58 do not reach into the transition region 56 to the axial bearing (no break through) but rather that here again there is a region 61 that is free of deeper set radial bearing grooves (called the quiet zone). Furthermore, the seal belt zone 59 in the radially inner transition region of the axial bearings can be seen from this drawing.

At the radially outward region of the axial bearing 38, there is a region 60, called the pad-area, in which the axial bearing gap first widens and is larger than the sum of the depth of the axial bearing grooves 43 and of the axial bearing gap in the region of the axial bearing. Radially further outwards, the wall of the bearing bush 16 translates into a slant 17, which, in the region of contact with the bearing bush 22, is finally positioned axially closer to the adjacent bearing exit than is the axial position of the lower bearing plate 20 in the region of the axial bearing 38.

Figure 15:
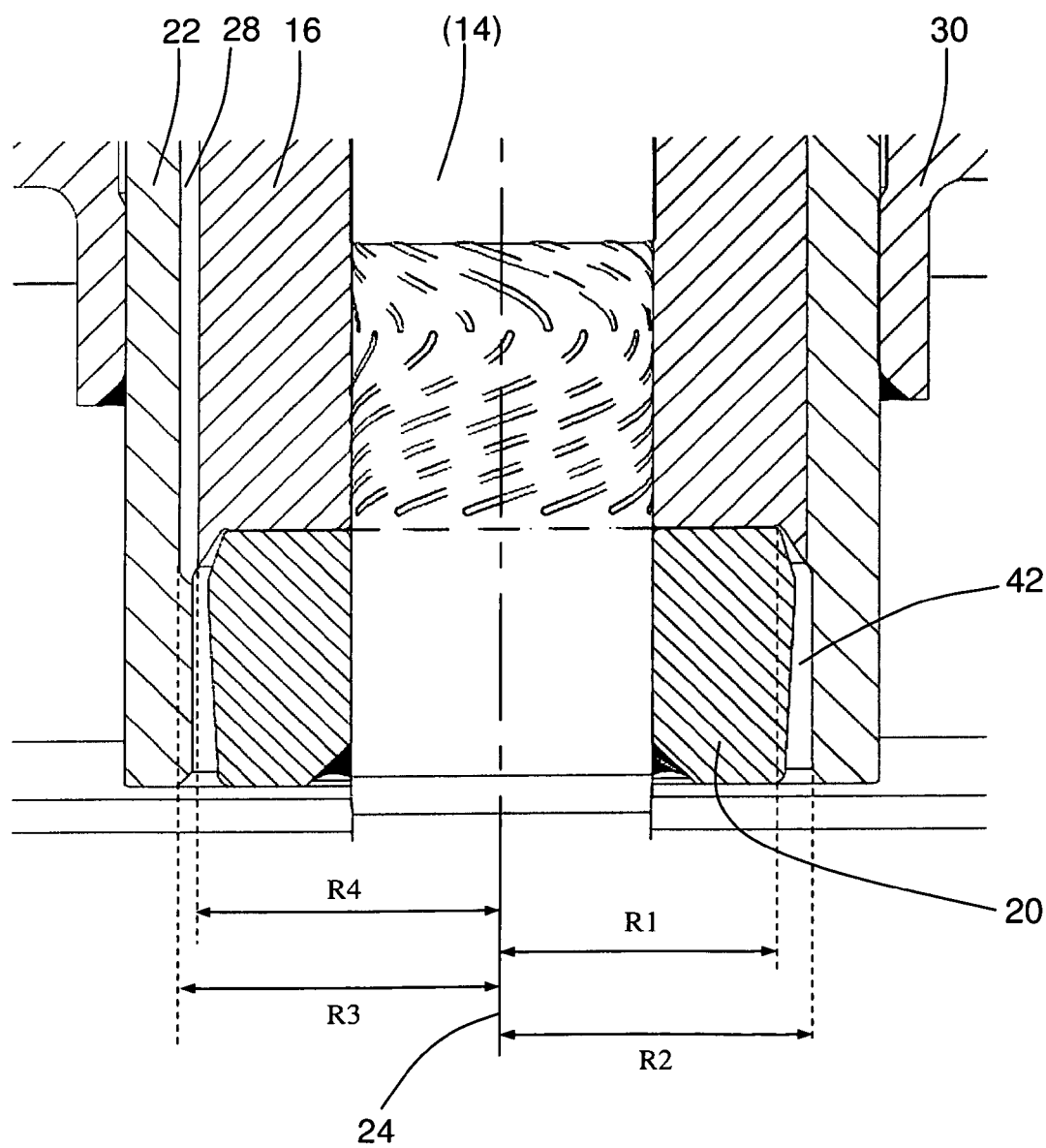
FIG. 15 shows a detail of a further embodiment of the bearing.

FIG. 15 shows a further embodiment of the invention. Here, the recirculation channel 28 is provided in the bearing sleeve 22 further towards the outside in a radial direction and has a lower opening that ends laterally in the tapered sealing gap 42, which is disposed between the lower bearing plate 20 and the bearing sleeve 22. Here, the largest distance R3 of the recirculation channel 28 to the rotational axis 24 is now greater than the largest distance R2 of the sealing gap 42 to the rotational axis 24.

Since, due to the centrifugal force, the bearing pressure continuously increases in a radial direction from the inside towards the outside, any outgassing air bubbles in the bearing fluid will move in the direction of the lower pressure and thus largely along the radially inner wall of the recirculation channel 28, leave the recirculation channel 28 inwards in a radial direction and finally escape from the bearing through the capillary seal of the sealing gap 42.

Figure 16:
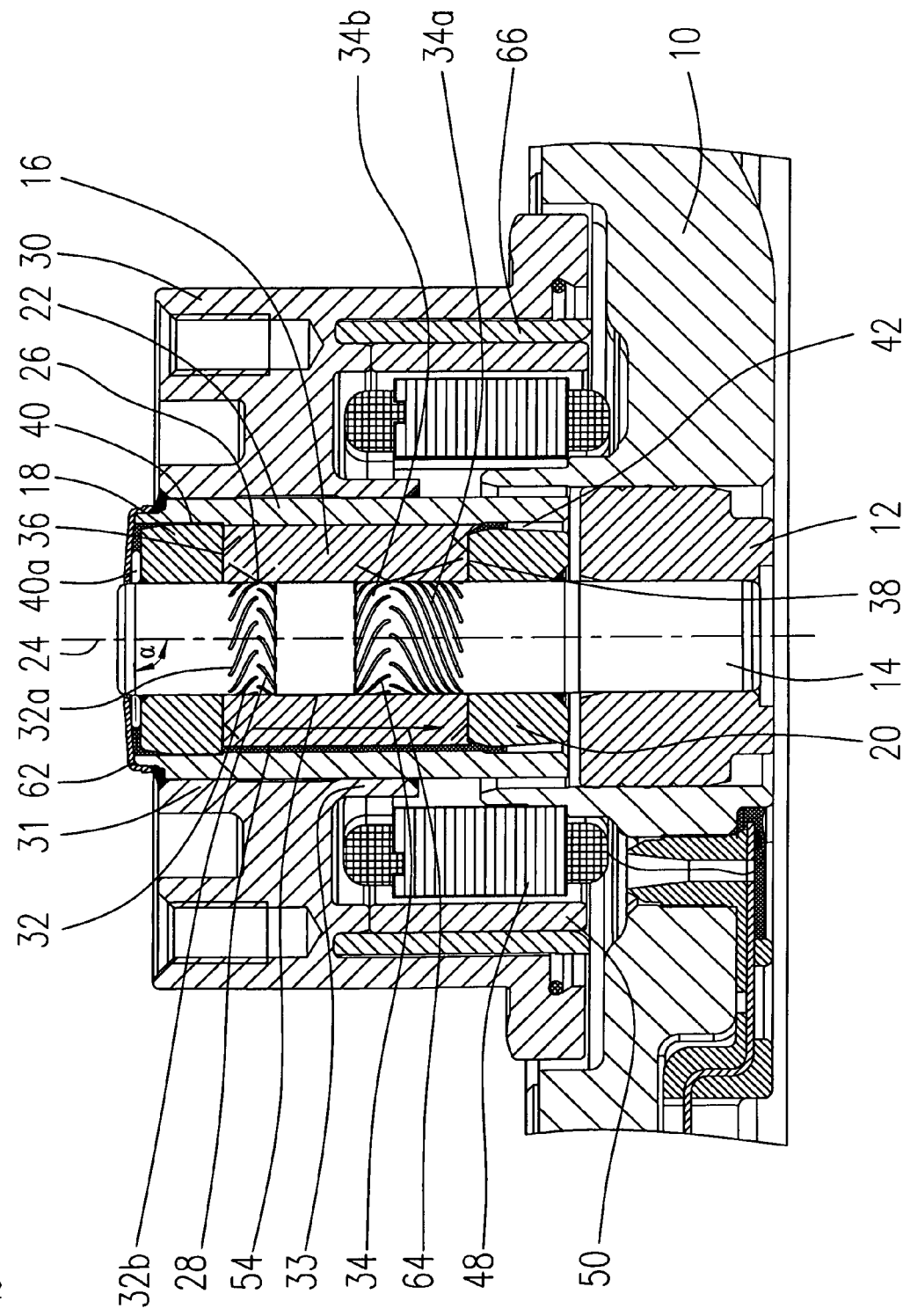
FIG. 16 shows a schematic sectional view of a spindle motor having a further embodiment of the fluid dynamic bearing system.

FIG. 16 shows an embodiment of the invention similar to the embodiment in FIG. 1. Identical parts or parts having the same effect are provided with the same reference numbers. An open end of the bearing gap 26 is sealed by the upper sealing gap 40 that extends between the sleeve 22 and the outside diameter of the upper bearing plate 18. The sealing gap 40 is partly filled with bearing fluid and acts as a capillary seal. An annular covering cap 62, which is inserted into an opening of the hub 30, covers the bearing plate 18 and seals the bearing against the environment. The sealing gap 40 is not only defined by the bearing plate 18 and the sleeve 22 but rather continues along the end face of the bearing plate 18 and is defined from above by the covering cap 62. The covering cap 62 may be a simple punched part that can be manufactured at low-cost. The sealing gap 40, or at least a section of the sealing gap 40, particularly the section between the bearing plate 18 and the covering cap 62, is inclined at an angle α, with respect to the rotational axis 24, to be precise it is inclined radially inwards in the direction of the rotational axis. Bearing fluid is found in this region inclined at angle α, at least when the motor is at a standstill.

The other open end of the bearing gap is sealed by the sealing gap 42 that extends between the outside circumference of the lower bearing plate 20 and the inside circumference of the sleeve 22. The sealing gap 42 is proportionately filled with bearing fluid and acts as a capillary seal. This capillary seal is preferably designed as a tapered capillary seal in which the sealing gap 42 tapers, widening towards the outside. The bearing plate 20 preferably has a conical contraction on its outside circumference so that a tapered space is formed between the bearing plate 20 and the sleeve 22.

In a preferred embodiment of the invention, provision can be made for the inside circumference of the sleeve 22 to be inclined radially inwards in the direction to the rotational axis 24 in the region of the sealing gap 42 in its course to the lower end of the bearing, such that the bearing plate 30 can still be mounted. The surface of the sleeve 22 adjoining the sealing gap 42 may also extend in a straight line, i.e. parallel to the rotational axis 24. The outside circumference of the bearing plate 20 is likewise inclined slightly radially inwards in its course to the end of the bearing, so that the sealing gap 42 widens conically outwards. I.e. the angle to the rotational axis 24 by which the inner wall of the sleeve 22 is inclined is smaller than the angle, by which the outer wall of the bearing plate 20 is inclined. As a whole, the sealing gap 42 may be inclined at an angle β with respect to the rotational axis 24 and to be precise, inclined radially inwards in the direction of the rotational axis.

The two radial bearings 32 and 34 are designed to be asymmetric, i.e. they have asymmetric herringbone bearing patterns that pump the bearing fluid at varying intensities in varying directions. The bearing patterns 32a, 34a adjacent to the axial bearings pump into the interior of the bearing in the direction of the separator 54, whereas the bearing patterns 32b, 34b adjacent to the separator pump towards the outside in the direction of the axial bearings. The two axial bearings 36, 38 preferably have bearing patterns taking the form of spiral grooves and both pump towards the interior of the bearing in the direction of the adjacent radial bearings. The pumping action of the two axial bearings 36, 38 is directed in the opposite direction to one another and compensate each other.

Bearing patterns 34a of the radial bearing 34 are made particularly long compared to bearing patterns 34b, 32a, 32b, so that their pumping effect distinctly predominates in the bearing. As a result, the bearing fluid in the axial section of the bearing gap 26 flows from radial bearing 34 in the direction of radial bearing 32 and further in the direction of axial bearing 36 and flows further via the recirculation channel 28 in direction of flow 46 to the lower axial bearing 38 and from there back to radial bearing 34. A closed fluid loop is formed.

The pumping action of bearing patterns 34a, however, produces higher overall pressure in the upper region of the bearing, i.e. in the region of the upper axial bearing 36 and the upper sealing gap 40, so that the bearing fluid would be pressed into the sealing gap 40 and then out of it. This means that there is need of a counterforce acting on the bearing fluid that establishes the necessary equilibrium of pressure in the bearing gap.

The angle of the sealing gaps is measured at the center, i.e. as a bisector of the angle of the inner wall of the sleeve 22 or of the covering cap 62 as well as the angle of the outer wall of the bearing plate. According to the invention, at least in a section 40a, the sealing gap 40 is inclined at an angle α (in the illustrated example a being approximately 90°) with respect to the rotational axis 24. And to be precise, only that section 40a of the sealing gap that is located between the end face of the bearing plate 18 and the covering cap 62 is inclined. Due to the inwards inclination of section 40a of the sealing gap 40 at an angle α in the direction of the rotational axis 24, the bearing fluid found in section 40a is pressed radially outwards due to the centrifugal force arising when the bearing is in operation. Pressure is produced in the bearing gap 40 that is directed towards the interior of the bearing and counteracts the pressure generated by the radial bearings that acts in the direction of the sealing gap 40 and compensates this pressure.

The lower sealing gap 42 may likewise be inclined in the direction of the rotational axis at an angle β. However, since no excess pressure prevails in the region of the sealing gap 42, angle β may be very small and even zero. In the illustrated embodiment, angle β is approximately 0°.

It is important that angle β is distinctly smaller than angle α, so that the pressure on the bearing fluid generated by the centrifugal force is greater in sealing gap 40 than in sealing gap 42. In accordance with the definition in the drawings, angle α may also be greater than 90°, particularly if the end face of the bearing plate 18 and the covering cap 62 as well run at an angle to the shaft 14. This case is also to be included in the invention. Depending on the side from which the angle is measured, it is always smaller than or equal to 90° with respect to the rotational axis 24.

Figure 17:
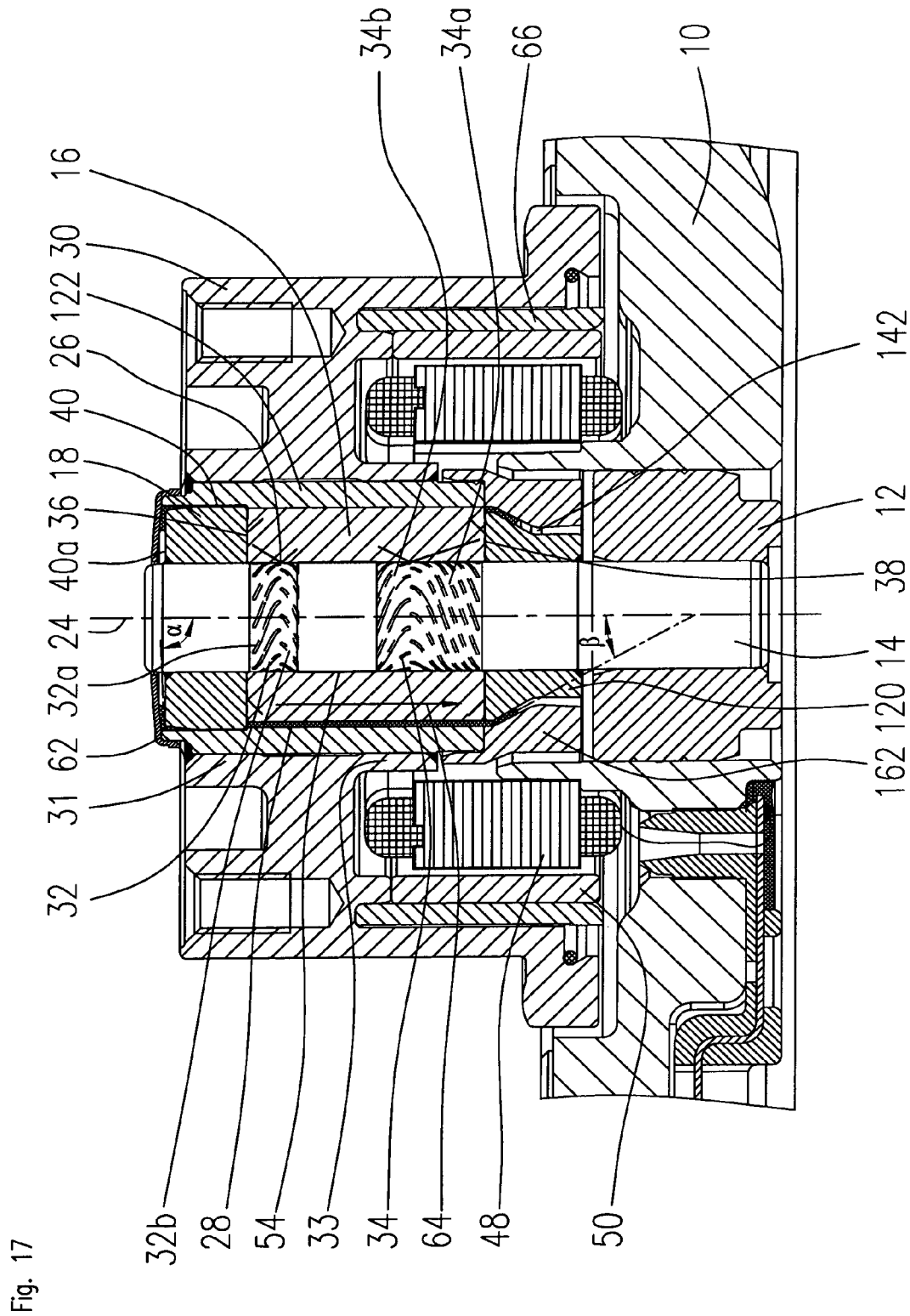
FIG. 17 shows a schematic sectional view of a spindle motor having a final embodiment of the fluid dynamic bearing system.

FIG. 17 shows a spindle motor having a further embodiment of a bearing system according to the invention, identical parts being given the same reference numbers as in FIG. 16. The construction and functionality substantially correspond to the description of the spindle motor of FIG. 16.

In contrast to the bearing system of FIG. 16, the lower sealing arrangement is designed somewhat differently. The lower bearing plate 120 has a stronger contraction at its outside circumference in the direction of the holding bush and defines the sealing gap 142 radially inwards. The sleeve 122, which encloses the bearing bush 16, no longer covers the outside circumference of the lower bearing plate 120, but rather ends substantially flush with the edge of the bearing bush 16. The outer boundary of the sealing gap 142 is thus no longer formed by the sleeve but rather by an additional part taking the form of an annular cap 156. The cap 156 has a surrounding rim by means of which it is slipped onto the sleeve 122. Starting from the bearing gap, the sealing gap first runs at an angle β inwards in the direction of the rotational axis 24 and then merges into a substantially axial section. In the illustrated embodiment, the angle is approximately β=30°. As a result, the centrifugal force in the sealing gap 142 acting on the bearing fluid increases in comparison to FIG. 1, where angle β=0. Consequently, pressure is generated in the sealing gap 142 in the direction of the transition from the recirculation channel 28 to the bearing gap of the axial bearing 38. This may be advantageous since, due to their relatively large pumping effect in the direction of the radial bearing 32, bearing patterns 34a could generate a lower pressure or even negative pressure in the axial bearing 38 that is at least partly compensated by the pressure generated by the centrifugal force in the sealing gap 142.

IDENTIFICATION REFERENCE LIST

10 Baseplate
12 Holding bush
14 Shaft
15 Slanting surface
16 Bearing bush
17 Slanting surface
18 Upper bearing plate
20 Lower bearing plate
21 Slanting annular space
22 Sleeve
23 Mouth
24 Rotational axis
26 Bearing gap
28 Recirculation channel
29 Direction of arrow
30 Hub
31 Upper connecting region of the hub 32 Radial bearing
32a,b Radial bearing regions
33 Lower connecting region of the hub
34 Radial bearing
34a,b Radial bearing regions
35 Air bubbles
36 Axial bearing
37 Direction of arrow
38 Axial bearing
39 Tapered gap
40 Sealing gap
40a Section of the sealing gap
41 Direction of arrow
42 Sealing gap
43 Axial bearing grooves
44 Pumping seal
45 Venting device
46 Region
47 Vertical
48 Stator arrangement
49 Wall
50 Permanent magnet
52 Reservoir
54 Separator
56 Transition area
58 Radial bearing grooves
59 Region (seal belt)
60 Region (pad area)
61 Region (quiet zone)
62 Covering cap (44 in PM07101)
64 Direction of flow (46 in PM 07101)
66 Yoke (52 in PM 07101)
116 Bearing bush
120 Lower bearing plate
122 Sleeve
128 Recirculation channel
142 Sealing gap
156 Annular insert
162 Covering cap (156 in PM 07101)
216 Bearing bush
222 Sleeve
228 Recirculation channel
229 Transversal channel
231 Transversal channel
314 Shaft
316 Outer bearing bush
318 Upper bearing plate
320 Lower bearing plate
322 Sleeve
324 Rotational axis
326 Bearing gap
328 Recirculation channel
332 Radial bearing
334 Radial bearing
336 Axial bearing
338 Axial bearing
340 Sealing gap (reservoir)
342 Sealing gap (reservoir)
R1 Largest diameter of the bearing plate(s) (or bearing surfaces of the bearing plate)
R2 Largest diameter of the sealing gap
R3 Largest diameter of the recirculation channel
R4 Smallest diameter of the recirculation channel

The invention claimed is:

1. A fluid dynamic bearing system comprising:
at least one stationary part that has a shaft (14) and two bearing plates (18; 20), an upper and a lower bearing plate, disposed on the shaft at a mutual spacing,
at least one rotating part that is supported so as to rotate about a rotational axis (24) with respect to the stationary part, and comprises a bearing bush (16) and a sleeve (22) that is connected to a hub enclosing the bearing bush, the bearing bush being rotatably disposed on the shaft between the bearing plates,
a bearing gap (26) that is formed between opposing bearing surfaces of the stationary and the rotating part, and separates the opposing surfaces of the shaft, the bearing bush, the bearing plates and the sleeve from one another, wherein the bearing gap is filled with bearing fluid,
a first sealing gap (40) and a second sealing gap (42) that extends concentric to the rotational axis (24) for sealing the bearing gap (26), the sealing gap being proportionately filled with bearing fluid,
a first fluid dynamic radial bearing (32) and a second fluid dynamic radial bearing (34) that are formed by adjoining surfaces of the shaft and of the bearing bush and separated from one another by a separator region disposed on the shaft and within the bearing gap,
a first fluid dynamic axial bearing (36) and a second fluid dynamic bearing (38), and
at least one recirculation channel (28) in the region of the sleeve and/or the bearing bush that connects the two axial bearing regions to each other,
characterized in that,
at least in sections, the first and second sealing gaps (40, 42; 142) are inclined with respect to the rotational axis (24) at angles α and β respectively, wherein angle α of the first sealing gap (40) located upstream of the prevailing direction of flow (46) of the bearing fluid in the recirculation channel (28) is greater than angle β of the sealing gap (42) located downstream, wherein the prevailing direction of flow of the bearing fluid in the recirculation channel (28) is from the first axial bearing region to the second axial bearing region.

2. A fluid dynamic bearing system according to claim 1, characterized in that angles α and β are between 0° and 90°.

3. A fluid dynamic bearing system according to claim 1, characterized in that the sealing gaps (40, 42; 142) are designed as capillary seals.

4. A fluid dynamic bearing system according to claim 1, characterized in that the sealing gaps (40, 42; 142) are designed as tapered capillary seals.

5. A fluid dynamic bearing system according to claim 1, characterized in that the outside diameter of the bearing plates (18; 20; 120) becomes smaller starting from the bearing gap.

6. A fluid dynamic bearing system according to claim 1, characterized in that the outside diameter of the bearing plates (18, 20; 120) varies over the length of the adjoining sealing gap (40; 42; 142).

7. A fluid dynamic bearing system according to claim 1, characterized in that the first and second radial bearings (32, 34) comprise bearing patterns that are provided on the surface of the shaft (14) or of the bearing bush (16) and run from a separator region (54) disposed between the radial bearings (32, 34) up to the end faces of the bearing bush (16).

8. A fluid dynamic bearing system according to claim 7, characterized in that the bearing patterns of the first and second radial bearings (32; 34) are asymmetric and generate a pumping effect on the bearing fluid in a defined direction.

9. A fluid dynamic bearing system according to claim 8, characterized in that the pumping effect of the second radial bearing (34) is substantially directed in the direction of a first axial bearing (36), whereas the pumping effect of the first radial bearing (32) is substantially directed in the direction of a second axial bearing (38).

10. A fluid dynamic bearing system according to claim 1, characterized in that a first axial bearing (36) is formed by the opposing surfaces of the end faces of the first bearing plate (18) and of the bearing bush (16), and a second axial bearing (38) is formed by the opposing surfaces of the end faces of the second bearing plate (20; 120) and of the bearing bush (16).

11. A fluid dynamic bearing system according to claim 1, characterized in that the axial bearings (36, 38) have bearing patterns that run from an outer rim of the end faces of the bearing plate (18, 20; 120) or bearing bush (16) up to an inner rim of the end faces of the bearing plate or bearing bush.

12. A fluid dynamic bearing system according to claim 11, characterized in that the axial bearings (36, 38) have bearing patterns taking the form of spiral grooves.

13. A fluid dynamic bearing system according to claim 11, characterized in that the bearing patterns of the axial bearings (36, 38) generate a pumping effect on the bearing fluid directed in the direction of the adjacent radial bearings.

14. A fluid dynamic bearing system according to claim 1, characterized in that the sleeve (22; 122) has a middle region and two rim regions, the inner diameter of the sleeve in at least one rim region being smaller than the inner diameter of the middle region.

15. A fluid dynamic bearing system according to claim 1, characterized in that the recirculation channel (28) is disposed at the outer surface of the bearing bush (16).

16. A fluid dynamic bearing system according to claim 15, characterized in that the recirculation channel (28) runs like a spiral in an axial direction.

17. A fluid dynamic bearing system according to claim 1, characterized in that the recirculation channel (28) is disposed at the inner surface of the sleeve (22; 122).

18. A spindle motor comprising a stator and a rotor, an electromagnetic drive system and a fluid dynamic bearing system according to claim 1.

19. A fluid dynamic bearing system comprising:
at least one stationary part that has a shaft (14) and two bearing plates (18; 20), an upper and a lower bearing plate, disposed on the shaft at a mutual spacing,
at least one rotating part that is supported so as to rotate about a rotational axis (24) with respect to the stationary part, and comprises a bearing bush (16) and a sleeve (22) that is connected to a hub enclosing the bearing bush, the bearing bush being rotatably disposed on the shaft between the bearing plates,
a bearing gap (26) that is formed between opposing bearing surfaces of the stationary and the rotating part, and separates the opposing surfaces of the shaft, the bearing bush, the bearing plates and the sleeve from one another,
a first sealing gap (40) and a second sealing gap (42) that extends concentric to the rotational axis (24) for sealing the bearing gap (26), the sealing gap being proportionately filled with bearing fluid,
a first fluid dynamic radial bearing (32) and a second fluid dynamic radial bearing (34) that are formed by adjoining surfaces of the shaft and of the bearing bush and separated from one another by a separator region that is filled with bearing fluid,
a first fluid dynamic axial bearing (36) and a second fluid dynamic bearing (38), and
at least one recirculation channel (28) in the region of the sleeve and/or the bearing bush that connects the two axial bearing regions to each other, and
wherein the first and second sealing gaps (40, 42; 142) are inclined with respect to the rotational axis (24) at angles $\alpha$ and $\beta$ respectively, wherein angle $\alpha$ of the first sealing gap (40) located upstream of the prevailing direction of flow (46) of the bearing fluid in the recirculation channel (28) is greater than angle $\beta$ of the sealing gap (42) located downstream, wherein the prevailing direction of flow of the bearing fluid in the recirculation channel (28) is from the first axial bearing region to the second axial bearing region, and
wherein the first and second radial bearings (32, 34) comprise bearing patterns that are provided on the surface of the shaft (14) or of the bearing bush (16) and run from a separator region (54) disposed between the radial bearings (32, 34) up to the end faces of the bearing bush (16), and
wherein the bearing patterns of the first and second radial bearings (32; 34) are asymmetric and each generates a pumping effect on the bearing fluid in a defined direction, and
wherein the pumping effect of the second radial bearing (34) is substantially directed in the direction of the first axial bearing (36), whereas the pumping effect of the first radial bearing (32) is substantially directed in the direction of the second axial bearing (38).

* * * * *